United States Patent
Naganuma

(10) Patent No.: US 11,054,955 B2
(45) Date of Patent: Jul. 6, 2021

(54) DISPLAY DEVICE

(71) Applicant: Japan Display inc., Tokyo (JP)

(72) Inventor: Tomohiko Naganuma, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 16/868,977

(22) Filed: May 7, 2020

(65) Prior Publication Data

US 2020/0264731 A1    Aug. 20, 2020

Related U.S. Application Data

(63) Continuation of application No. PCT/JP2018/039940, filed on Oct. 26, 2018.

(30) Foreign Application Priority Data

Nov. 16, 2017  (JP) .............................. JP2017-220954

(51) Int. Cl.
    *G06F 3/044* (2006.01)

(52) U.S. Cl.
    CPC .......... *G06F 3/0445* (2019.05); *G06F 3/0446* (2019.05)

(58) Field of Classification Search
    CPC ....... G06F 3/044; G06F 3/0445; G06F 3/0446
    See application file for complete search history.

(56) References Cited

U.S. PATENT DOCUMENTS

| | | | |
|---|---|---|---|
| 10,170,727 B2 | 1/2019 | Sato et al. | |
| 10,275,106 B2* | 4/2019 | Kwak | G06F 3/044 |
| 2008/0002079 A1* | 1/2008 | Kimura | G02B 6/0051 349/42 |
| 2009/0166637 A1* | 7/2009 | Park | H01L 27/1248 257/71 |
| 2010/0328259 A1* | 12/2010 | Ishizaki | G02F 1/13338 345/174 |
| 2011/0242027 A1* | 10/2011 | Chang | G06F 3/047 345/173 |

(Continued)

FOREIGN PATENT DOCUMENTS

| | | |
|---|---|---|
| JP | 2006-310551 A | 12/2008 |
| JP | 2010-182027 A | 8/2010 |
| JP | 2015-050245 A | 3/2015 |

OTHER PUBLICATIONS

International Search Report dated Dec. 11, 2018 for PCT/JP2018/039940 filed on Oct. 26, 2016, 1 page.

*Primary Examiner* — Amy Onyekaba
(74) *Attorney, Agent, or Firm* — Xsensus LLP

(57) ABSTRACT

A display device includes a display region including a plurality of pixels and a separation region between each of the plurality of pixels and a touch sensor overlapping the display region. The touch sensor includes a sensor electrode and an insulating layer. The sensor electrode includes a first sensor electrode pattern overlapping at least one of the plurality of pixels and a second sensor electrode pattern overlapping at least a part of the separation region. The insulating layer is arranged between the first sensor electrode pattern and the second sensor electrode pattern, and overlaps the first sensor electrode pattern, and covers a first region of the first sensor electrode pattern. The second sensor electrode pattern is arranged on the insulating layer and the first sensor electrode pattern, and connected to a second region of the first sensor electrode pattern.

11 Claims, 19 Drawing Sheets

(56) References Cited

U.S. PATENT DOCUMENTS

| | | | |
|---|---|---|---|
| 2012/0241408 A1* | 9/2012 | Misaki | B32B 15/04 216/20 |
| 2014/0070350 A1* | 3/2014 | Kim | G06F 3/0443 257/432 |
| 2014/0152613 A1* | 6/2014 | Ishizaki | G02F 1/134336 345/174 |
| 2014/0168540 A1* | 6/2014 | Wang | G06F 3/0443 349/12 |
| 2014/0353625 A1* | 12/2014 | Yi | H01L 51/5281 257/40 |
| 2015/0002466 A1* | 1/2015 | Takeuchi | G06F 3/0418 345/174 |
| 2015/0015532 A1* | 1/2015 | Choung | G06F 3/0445 345/174 |
| 2015/0179978 A1* | 6/2015 | Sato | H01L 51/5275 257/40 |
| 2015/0234425 A1* | 8/2015 | Kim | G02F 1/134363 345/174 |
| 2015/0346866 A1* | 12/2015 | Kusunoki | G06F 3/04166 345/174 |
| 2016/0070406 A1* | 3/2016 | Han | G06F 3/0443 345/173 |
| 2016/0077629 A1* | 3/2016 | Ono | G06F 3/0446 345/174 |
| 2016/0103548 A1* | 4/2016 | Jun | G06F 3/0412 345/173 |
| 2016/0111686 A1* | 4/2016 | Sato | H01L 51/5234 257/40 |
| 2016/0117031 A1* | 4/2016 | Han | G06F 3/0443 345/174 |
| 2016/0124557 A1* | 5/2016 | Choi | G06F 1/1626 345/173 |
| 2016/0179259 A1* | 6/2016 | Watanabe | G06F 3/0445 345/174 |
| 2016/0195983 A1* | 7/2016 | Miyake | G06F 3/0448 345/174 |
| 2016/0224181 A1* | 8/2016 | Kim, II | G06F 3/0445 |
| 2016/0349558 A1* | 12/2016 | Shishido | G02F 1/13338 |
| 2017/0003792 A1* | 1/2017 | Berget | G06F 3/0443 |
| 2017/0075478 A1* | 3/2017 | Jeong | G06F 3/0412 |
| 2017/0077448 A1* | 3/2017 | Sakamoto | H01L 51/5253 |
| 2017/0212624 A1* | 7/2017 | Katsuta | G06F 3/04166 |
| 2017/0222180 A1* | 8/2017 | Sato | H01L 51/5246 |
| 2017/0235167 A1* | 8/2017 | Ishikawa | G02F 1/136286 349/43 |
| 2017/0250199 A1* | 8/2017 | Odaka | H01L 27/1248 |
| 2017/0269773 A1* | 9/2017 | Suzuki | G06F 3/04166 |
| 2017/0308199 A1* | 10/2017 | Liu | G06F 3/0443 |
| 2017/0308212 A1* | 10/2017 | Jin | G06F 3/0445 |
| 2018/0011385 A1* | 1/2018 | Kang | H01L 51/0094 |
| 2018/0069054 A1* | 3/2018 | Zhai | G06F 3/0412 |
| 2018/0122868 A1* | 5/2018 | Kim | H01L 27/3206 |
| 2018/0188849 A1* | 7/2018 | Ko | H01L 27/3272 |
| 2018/0373360 A1* | 12/2018 | Kwak | G06F 3/0416 |
| 2019/0102012 A1* | 4/2019 | Shi | G02F 1/133512 |
| 2019/0121463 A1* | 4/2019 | Park | G06F 3/041662 |

\* cited by examiner

DISPLAY DEVICE

CROSS REFERENCE TO RELATED APPLICATIONS

This application is a 35 U.S.C. 111(a) Bypass Continuation of PCT/JP2018/039940 filed on Oct. 26, 2018 and claims priority to Japanese Patent Application 2017-220954, filed on Nov. 16, 2017, the entire contents of both are incorporated herein by reference.

FIELD

An embodiment of the present invention relates to a display device.

BACKGROUND

As a display device used in electric appliances and electronic devices, a display device using a liquid crystal display element using electro-optical effects of liquid crystal or an organic electroluminescence device as a display element has been developed and commercialized. In recent years, a touch panel, which is a display device in which a touch sensor is mounted on a display element, has been rapidly spreading. The touch panel is indispensable in a portable data terminal such as a smart phone. For this reason, the development of touch panels is advancing worldwide in order to further advance the information society.

The touch panel structure described above has a method in which the touch sensor is manufactured on a different substrate from the display device and bonded with the display device, or is incorporated inside display device (in some cases, it is referred to as on-cell system). Japanese published unexamined patent application No. 2015-050245 discloses a structure of a touch panel.

SUMMARY

According to an embodiment of the present invention, a display device includes a display region including a plurality of pixels and a separation region between each of the plurality of pixels and a touch sensor overlapping the display region. The touch sensor includes a sensor electrode and an insulating layer. The sensor electrode includes a first sensor electrode pattern overlapping at least one of the plurality of pixels and a second sensor electrode pattern overlapping at least a part of the separation region. The insulating layer is arranged between the first sensor electrode pattern and the second sensor electrode pattern, and overlaps the first sensor electrode pattern, and covers a first region of the first sensor electrode pattern. The second sensor electrode pattern is arranged on the insulating layer and the first sensor electrode pattern, and connected to a second region of the first sensor electrode pattern.

According to another embodiment of the present invention, a display device includes a display region including a plurality of pixels and a separation region between each of the plurality of pixels and a touch sensor overlapping the display region. The touch sensor includes a sensor electrode and an insulating layer. The sensor electrode includes a first sensor electrode pattern overlapping at least one of the plurality of pixels and a second sensor electrode pattern overlapping at least a part of the separation region. The insulating layer is arranged between the first sensor electrode pattern and the second sensor electrode pattern, and overlaps the first sensor electrode pattern, and covers a first region of the second sensor electrode pattern The second sensor electrode pattern is arranged on the insulating layer and the first sensor electrode pattern, and connected to a second region of the first sensor electrode pattern.

DESCRIPTION OF EMBODIMENTS

Figure 1:
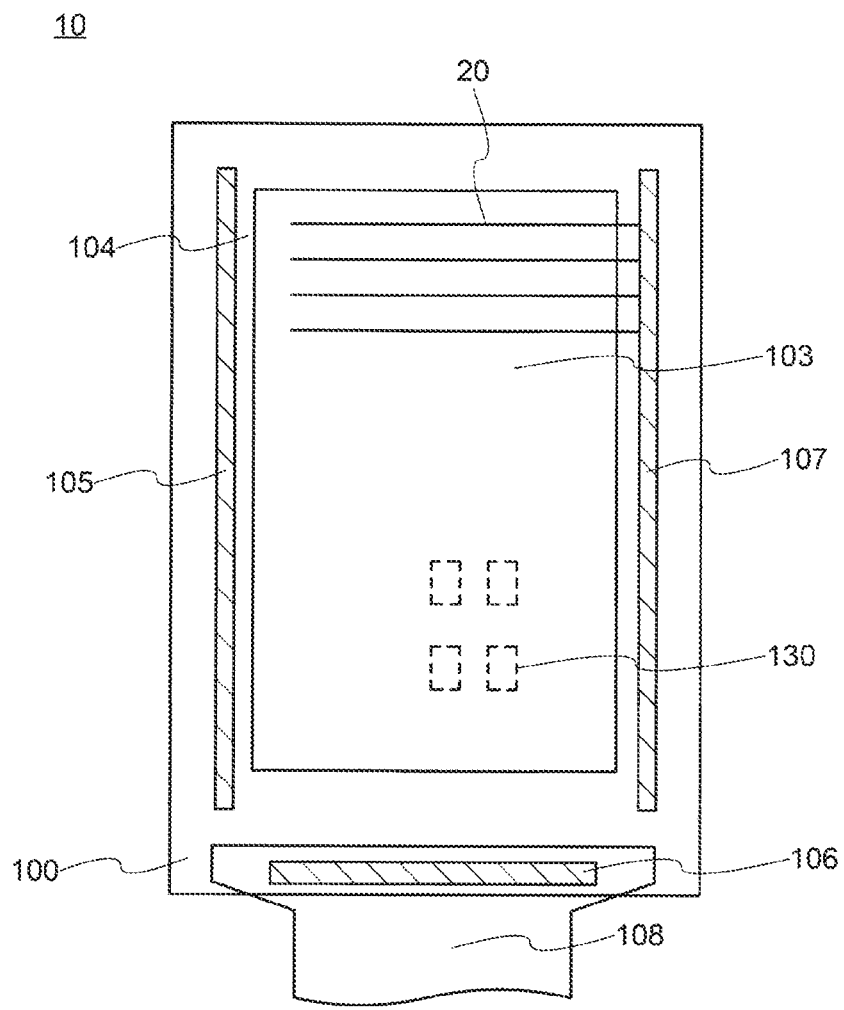
FIG. 1 is a top view showing a configuration of a display device according to an embodiment of the present invention.

Embodiments of the present invention will be described below with reference to the drawings. It is to be noted that the disclosure is merely an example, and what can be easily conceived by those skilled in the art with appropriate modifications while maintaining the gist of the invention are naturally included in the scope of the invention. In addition, although the drawings may schematically represent the width, thickness, shape, and the like of each portion as compared with actual embodiments for the sake of clarity of description, the drawings are merely an example and do not limit the interpretation of the present invention. In this specification and each drawing, the same reference numerals (or reference numerals with -1, -2, etc. after numerals) are given to the same elements as those described above with reference to the preceding drawings, and detailed description thereof may be omitted as appropriate. In addition, the letters "first" and "second" to each element are convenient labels used to distinguish each element and have no further meaning unless otherwise stated.

Furthermore, in the detailed description of the present invention, when defining the positional relationship between one component and another, the terms "above" and "below" include not only the case of being positioned directly above or below one component, but also the case of interposing another component therebetween, unless otherwise specified.

In the present specification, the terms "conductive layer", "electrode" and "wiring" have the similar meanings and can be interchanged depending on various situations.

When the touch panel is structured by incorporating the touch sensor into the display device, a new electrode (sometimes referred to as a sensor electrode) used for the touch sensor must be provided on the display element. In this case, the display element may be thermally damaged. Therefore, the range of temperature at the time of forming the sensor electrode and the insulating layer may be limited.

The transparency and resistivity of the sensor electrode affect the visibility of the display device, the detection rate and the detection accuracy of touch sensor. As described above, if the temperature at which the sensor electrode is formed is limited, the resistivity of the sensor electrode increases. In addition, writing to an electronic circuit may take time. As a result, the rate at which the touch sensor is detected is reduced. The resistivity of the sensor electrode decreases when the sensor electrode is formed from a metallic electrode. However, the sensor electrode needs to be positioned so as to avoid directly above the display region. Therefore, the area of the sensor electrode decreases, and the quantity of signals detected decreases. As a result, the signal-noise ratio (S/N ratio) of touch sensor is lowered.

Some embodiments described below are directed to the display device. One of those display devices includes those capable of improving the detection accuracy and the detection rate of the touch sensor without degrading the performance of the display element.

First Embodiment

FIG. 1 is a top view of a display device 10 according to the present embodiment.

(1-1. Configuration of the Display Device)

In FIG. 1, the display device 10 has a substrate 100, a display region 103, a peripheral portion 104, a driving circuit 105 and a driving circuit 106, a driving circuit 107 and a flexible printed circuit substrate 108. The driving circuit 105 functions as a gate driver. The driving circuit 106 functions as a source driver. The driving circuit 107 has a function of controlling the touch sensor. In the display region 103, a plurality of display elements 130 (sometimes referred to as pixel) is arranged in a lattice-shaped manner and spaced apart from each other. The display element 130 functions as a component of images.

In the display device 10, video signals are inputted to the driving circuit 106 via the flexible printed circuit substrate 108. Next, the driving circuit 105 and the driving circuit 106 drive the display element 130. As a result, still images and moving images are displayed in the display region 103.

(1-2. Configuration of the Touch Sensor)

Figure 2:
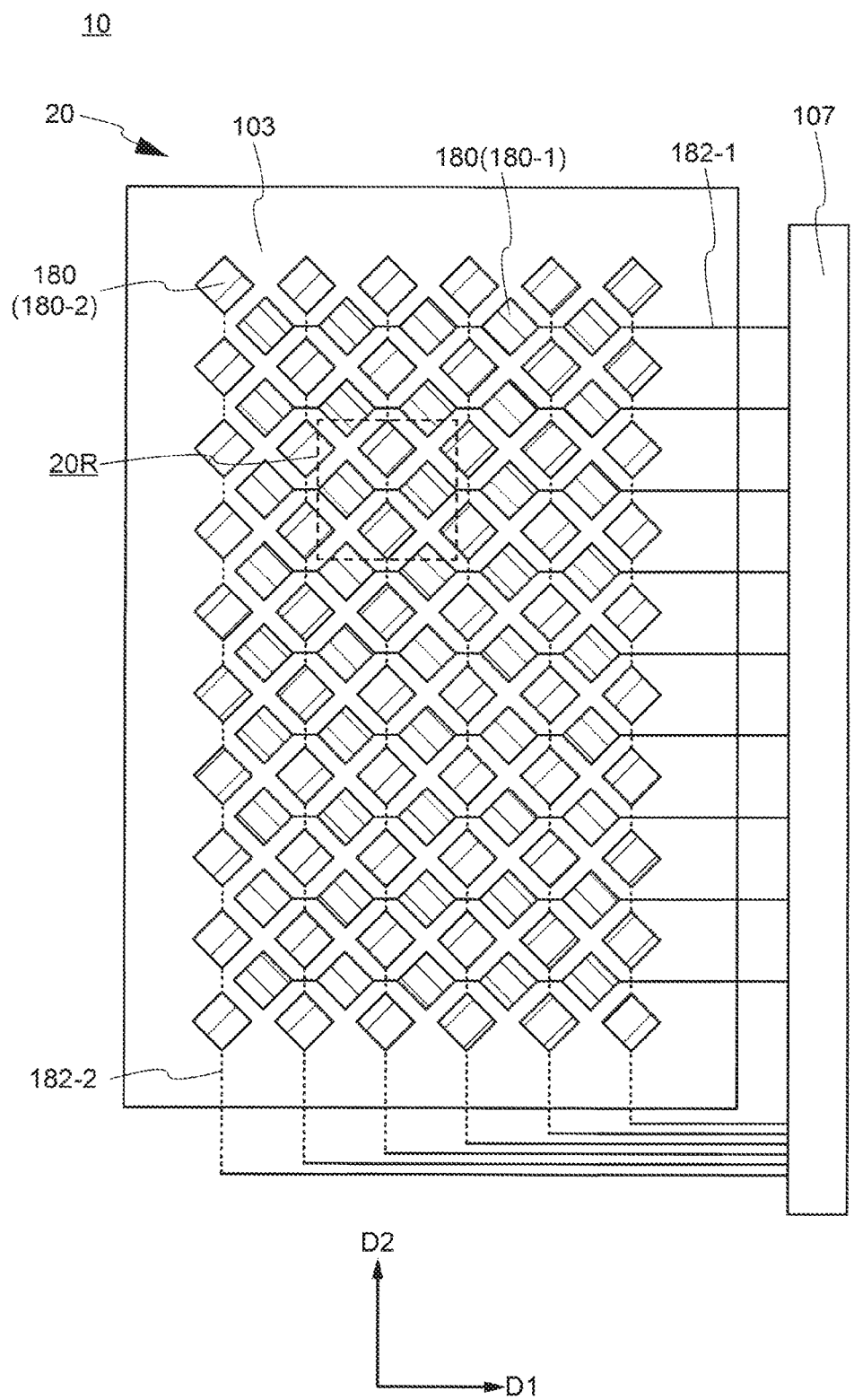
FIG. 2 is a top view showing a touch sensor according to an embodiment of the present invention.

Next, the configuration of the touch sensor will be described. FIG. 2 is a top view of a touch sensor 20 provided in the display device 10. The touch sensor 20 is provided to overlap with the display region 103. The touch sensor 20 includes a first sensor electrode 180-1, a second sensor electrode 180-2, and an insulating layer 191, which will be described later. The first sensor electrode 180-1 and the second sensor electrode 180-2 are connected to the driving circuit 107. The touch sensor 20 is provided on a sealing layer 161, which will be described later. The first sensor electrode 180-1 and the second sensor electrode 180-2 are collectively referred to as a sensor electrode 180. Hereinafter, when the first sensor electrode 180-1 and the second sensor electrode 180-2 need not be described separately, they will be described as the sensor electrode 180.

As shown in FIG. 2, the first sensor electrode 180-1 functions as a wiring (sometimes referred to as a first touch sensor wiring 182-1) which is arranged to extend in the short side (sometimes referred to as a first direction D1) of the display region 103. The first touch sensor wiring 182-1 is arranged side by side along the long side (sometimes referred to as a second region D2) of the display region 103. The first direction D1 and the second region D2 are crossed. The first sensor electrode 180-1 functions as a transmitting electrode in the touch sensor 20. Similarly, a plurality of second sensor electrodes 180-2 function as a wiring (sometimes referred to as a second touch sensor wiring 182-2) that is arranged to extend in on the second direction D2. The second touch sensor wiring 182-2 is arranged side by side along the first direction D1. The second sensor electrode 180-2 functions as a receiving electrode in the touch sensor 20. The first sensor electrode 180-1 may be the receiving electrode, and the second sensor electrode 180-2 may be the transmitting electrode.

Figure 3:
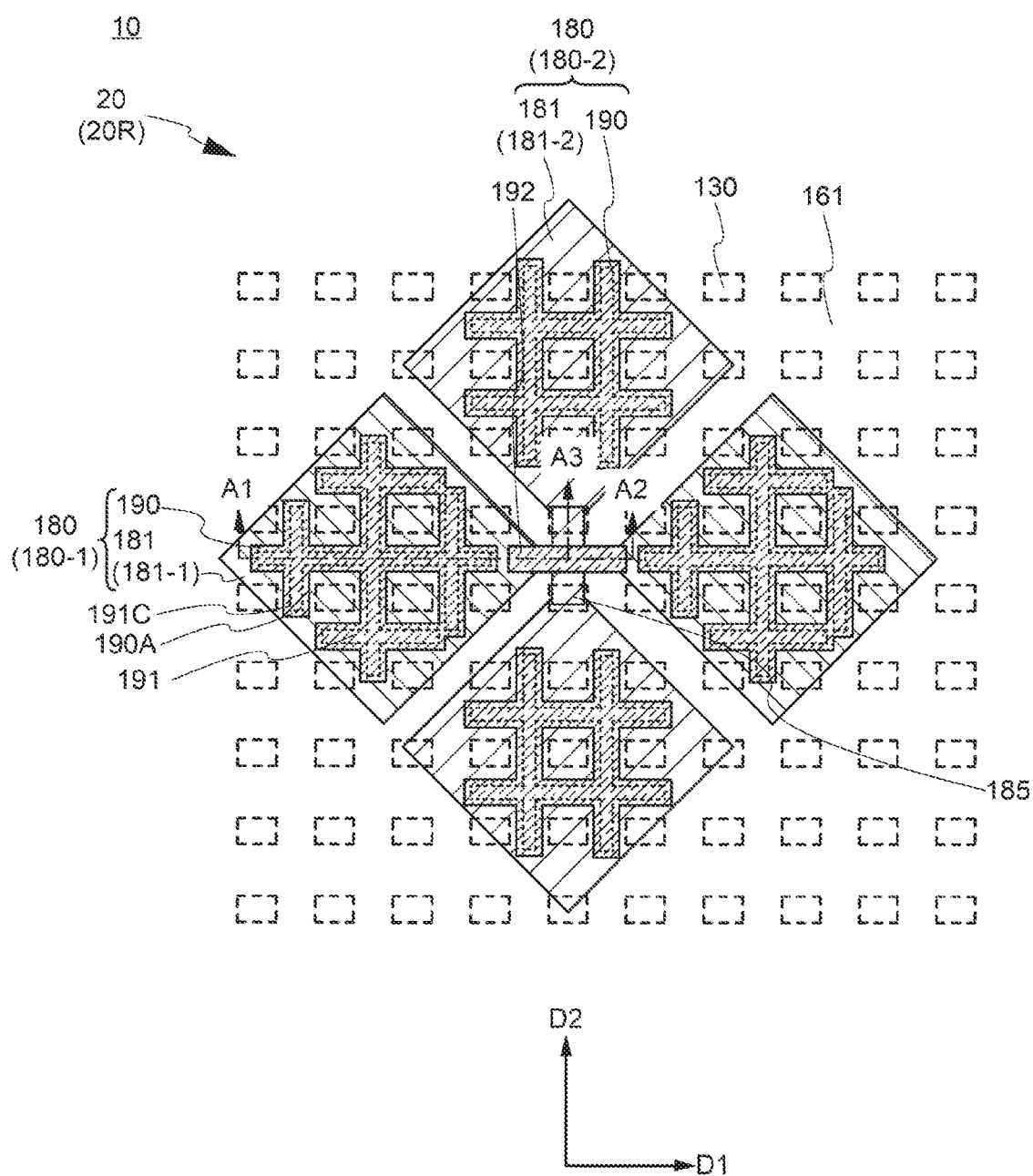
FIG. 3 is a top view showing the touch sensor according to an embodiment of the present invention.
Figure 4:
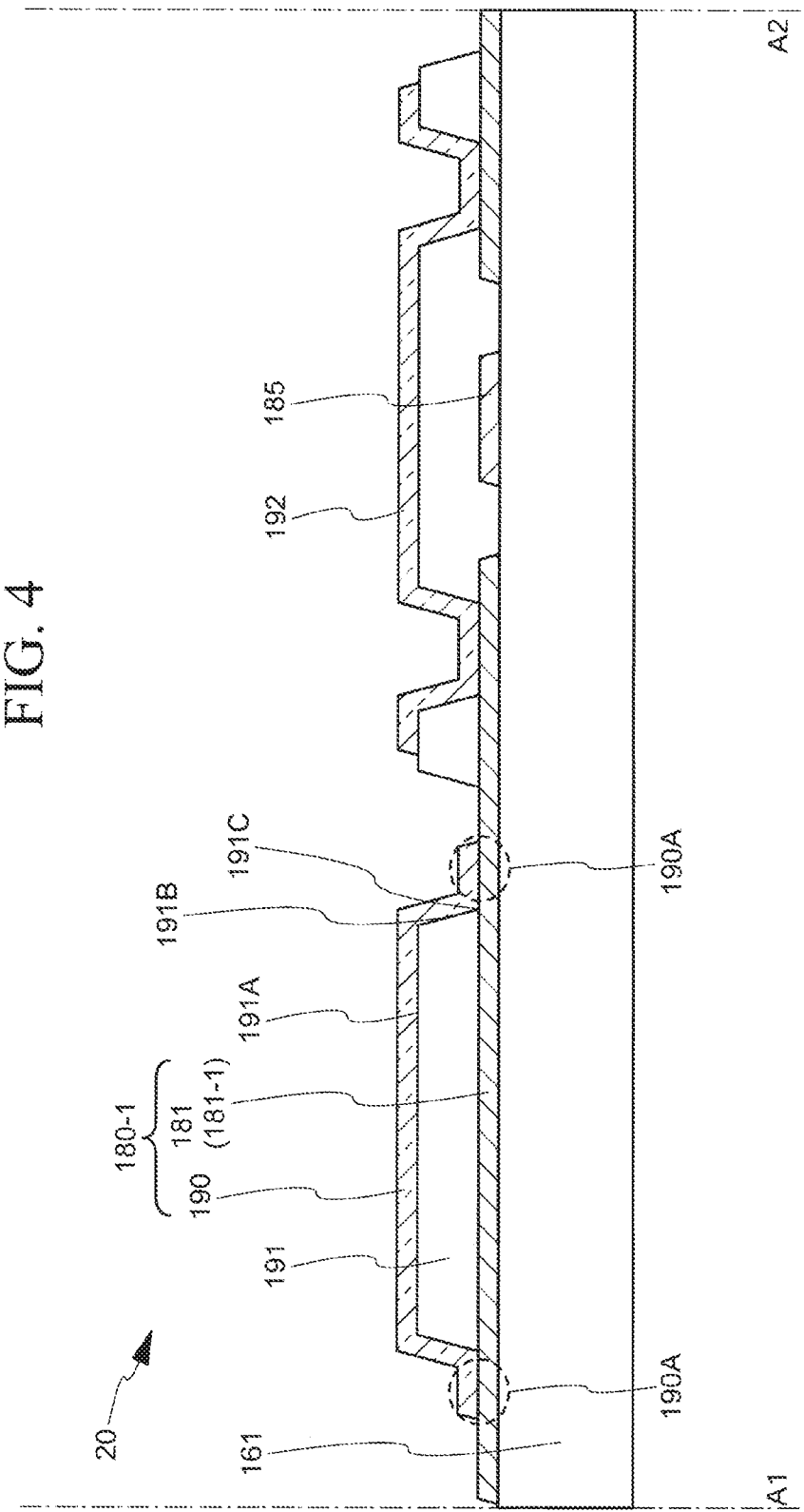
FIG. 4 is a cross-sectional view showing a part of the touch sensor according to an embodiment of the present invention.

Next, an enlarged top view of a region 20R of the touch sensor 20 is shown in FIG. 3. FIG. 4 shows a cross-sectional view between A1-A2 of the region 20R.

The sealing layer 161 is provided on a plurality of display elements 130 arranged in lattice-shaped. The sealing layer 161 is formed of an insulating layer. Details will be described later, but the sealing layer 161 includes an inorganic insulating layer on its upper surface. This prevents water from entering the display element 130.

The sensor electrode 180 has a first sensor electrode pattern 181 and a second sensor electrode pattern 190. The first sensor electrode pattern 181 is provided on the sealing layer 161. The first sensor electrode pattern 181 is arranged to overlap on the plurality of display elements 130 (pixel). The area of the first sensor electrode pattern 181 is larger than the area of one display element 130 (pixel). The first sensor electrode pattern 181 has light transmittance. As a result, the light emitted from the display element 130 is transmitted from the display device 10 to the outside.

For the first sensor electrode pattern 181 is formed of a material having light transmittance, for example indium-zinc oxide (IZO). The first sensor electrode pattern 181 is not limited to the indium zinc oxide (IZO). The first sensor electrode patter 181 may be formed of indium tin oxide (ITO), zinc oxide (ZnO), indium tin oxide zinc (ITZO), or the like.

Here, the first sensor electrode pattern 181 (sometimes referred to as a first sensor electrode pattern 181-1) of the first sensor electrode 180-1 and the first sensor electrode pattern 181 (sometimes referred to as a first sensor electrode pattern 181-2) of the second sensor electrode 180-2 are provided in a same layer. In this case, each of the first sensor electrode 180-1 is connected by a connection electrode 192. On the other hand, each of the second sensor electrode 180-2 is connected by a connecting portion 185. The connection electrode 192 is provided in a layer that differs from the first sensor electrode pattern 181. The connection electrode 192 is provided in the same layer as the second sensor electrode pattern 190. The connecting portion 185 is provided in the same layer as the first sensor electrode pattern 181.

The insulating layer 191 is arranged between the first sensor electrode pattern 181 and the second sensor electrode pattern 190. The insulating layer 191 is arranged in the surface of the first sensor electrode pattern 181. The insulating layer 191 is provided on the first sensor electrode pattern 181. The insulating layer 191 covers some regions of the first sensor electrode pattern 181. In this example, the insulating layer 191 is arranged to overlap with a region (referred to as separation region) between some pixels of the plurality of display elements 130 (pixel) when viewed from the top. The insulating layer 191 is formed of an organic insulating material such as acrylics. The insulating layer 191 is not limited to thereto, and may be formed of an inorganic insulating material or a stacked layer of the organic insulating material and the inorganic insulating material. The thickness of the insulating layer 191 is not limited, but may be, for example, several hundred nanometers or more and several micrometers or less.

The second sensor electrode pattern 190 is arranged to overlap with the first sensor electrode pattern 181. The second sensor electrode pattern 190 is arranged on the first sensor electrode pattern 181 and the insulating layer 191. As shown in FIG. 3, when viewed from the top, the second sensor electrode pattern 190 is arranged to overlap with a region between some pixels of the plurality of display elements 130 (pixel). This prevents the light emitted from the display element 130 from being blocked. The second sensor electrode pattern 190 includes a low resistivity metallic material. For example, the second sensor electrode pattern 190 is formed of aluminum (Al). The second sensor electrode pattern 190 is not limited to thereto, and may be formed of metal materials such as gold (Au), silver (Ag), copper (Cu), palladium (Pd), tungsten (W), and titanium (Ti).

As shown in FIG. 3, the second sensor electrode pattern 190 has a connecting portion 190A electrically connected to some other regions of the first sensor electrode pattern 181. The end portion 191C of the insulating layer 191 is surrounded by the connecting portion 190A.

In this case, as shown in FIG. 4, the insulating layer 191 is arranged on the first sensor electrode pattern 181. Further, the second sensor electrode pattern 190 is provided in contact with an upper surface 191A and a side surface 191B of the insulating layer 191, and the first sensor electrode pattern 181. The side surface 191B of the insulating layer 191 may have a forward tapered shape. This improves the coverage of the insulating layer 191 to the side surface 191B of the second sensor electrode pattern 190. The insulating layer 191 generally has a shape covered by the second sensor electrode pattern 190.

(1-3. Driving the Touch Sensor)

Here, the driving of the touch sensor will be described with reference to FIGS. 2 and 3. As shown in FIG. 2, the first touch sensor wiring 182-1 and the second touch sensor wiring 182-2 are connected to the driving circuit 107. The voltage supplied from the driving circuit 107 to the first sensor electrode 180-1 via the first touch sensor wiring 182-1 generates an electric field between the first sensor electrode 180-1 and the second sensor electrode 180-2. For example, when a human finger touches the display device 10, an electric field change occurs between the first sensor electrode 180-1 and the second sensor electrode 180-2. This causes a capacitance change between wiring. Next, predetermined data is inputted from the second sensor electrode 180-2 to the driving circuit 107 via the second touch sensor wiring 182-2. Thus, the position information is detected.

In the above-described structure, the second sensor electrode pattern 190 and the first sensor electrode pattern 181 are connected to each other, so that the resistivity of the entire sensor electrode 180 is lowered. Furthermore, the surface area of the second sensor electrode pattern 190 is larger than when connected only to the first sensor electrode pattern 181 without the insulating layer 191. This further reduces the resistivity of the entire sensor electrode 180. The reduced resistivity of the entire sensor electrode 180 increases the detection speed of the touch sensor. Further, the S/N ratio is improved by lowering the resistivity of the sensor electrode 180. As a result, the detection accuracy of the touch sensor of the present embodiment is improved.

When the contact area between the first sensor electrode pattern 181 and the second sensor electrode pattern 190 is large, the second sensor electrode pattern 190 may peel off at a portion where the stress is concentrated. On the other hand, in the structure of the present embodiment, the insulating layer 191 is sandwiched between the first sensor electrode pattern 181 and the second sensor electrode pattern 190. This reduces a contact region between the first sensor electrode pattern 181 and the second sensor electrode pattern 190. As a result, the stress is dispersed, so that peeling of the second sensor electrode pattern 190 is suppressed.

In the structure according to the present embodiment, the first sensor electrode pattern 181-1 of the first sensor electrode 180-1 and the first sensor electrode pattern 181-2 of the second sensor electrode 180-2 are provided on the same layer. Therefore, the touch sensor according to the present embodiment can detect a small capacitance change. Therefore, the detection accuracy of the touch sensor according to the present embodiment is improved.

Second Embodiment

In the present embodiment, a detailed structure of the display device 10 will be described.

(2-1. Configuration of the Display Device)

Figure 5:
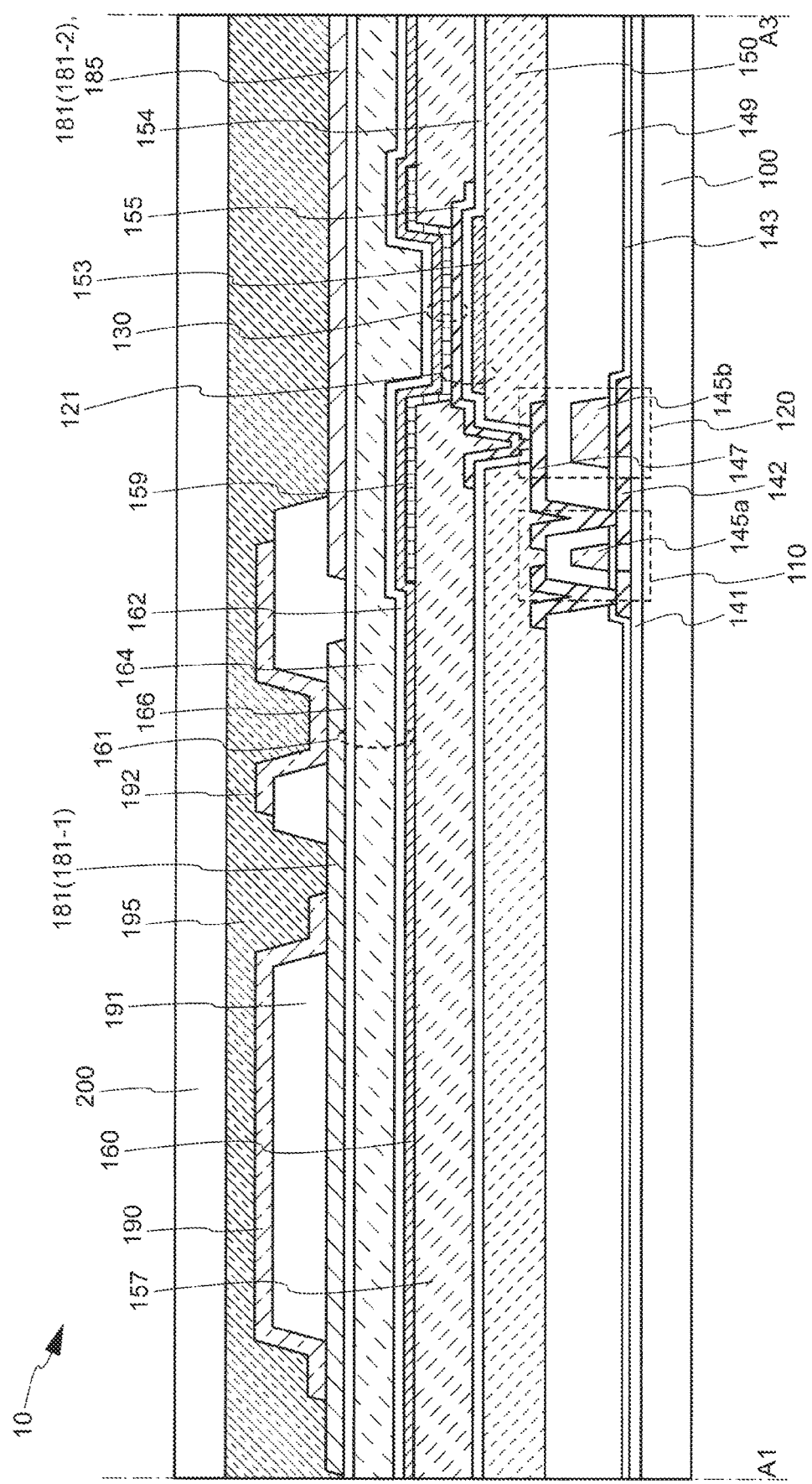
FIG. 5 is a cross-sectional view showing a structure of the display device according to an embodiment of the present invention.

FIG. 5 is a cross-sectional view of A1-A3 of the display device 10 of FIG. 3. As shown in FIG. 5, the display device 10 includes, in addition to the first sensor electrode pattern 181, the second sensor electrode pattern 190, and the insulating layer 191 used in the touch sensor, the substrate 100, a transistor 110, a capacity element 120, a capacitance element 121, the display element 130, an insulating layer 141, an insulating layer 149, an insulating layer 150, a bank layer 157, the sealing layer 161, an adhesive layer 195, and a substrate 200.

(2-2. Configuration of the Transistor)

In FIG. 5, the transistor 110 has a semiconductor layer 142, a gate insulating layer 143, a gate electrode 145a, and a source-drain electrode 147. The transistor 110, in this example, has a top gate-top contact structure. However, the transistor 110 is not limited thereto, and may have a bottom-gate structure or a bottom-contact structure.

For the capacity element 120, the gate insulating layer 143 as a dielectric, and the source or drain region of the semiconductor layer 142 and a capacitance electrode 145b are used. For the capacitance element 121, an insulating layer 154 as a dielectric, a conductive layer 153 and a pixel electrode 155 are used.

The display element 130 includes the pixel electrode 155, an organic EL layer 159, and a counter electrode 160. That is, the display element 130 is an organic EL element. The display element 130 has a so-called top emission type structure in which a light emitted from the organic EL layer 159 is emitted toward the counter electrode 160. The display element 130 is not limited to the top emission type and may have a bottom emission type structure.

For the substrate 100 and the substrate 200, a glass substrate or an organic resin substrate are used. When the organic resin substrate is applied to the substrate 100 and the substrate 200, a sheet display having flexibility can be realized. The substrate 100 and the substrate 200 may be required to have a transparency to extract the light emitted from the display element. Since the substrate on the side from which the light emitted from the display element is not extracted need not be transparent, another inorganic material or a metallic material may be used in addition to the aforementioned material.

The insulating layer 141 is provided on the substrate 100 and have a function as an under film. This can suppress the diffusion of impurities, typically alkaline metals, water, hydrogen, and the like, from the substrate 100 to the semiconductor layer 142.

The semiconductor layer 142 is formed of silicon, oxide semiconductor, organic semiconductor, or the like.

The gate insulating layer 143 is provided on the insulating layer 141 and the semiconductor layer 142. The gate insulating layer 143 is formed of silicon oxide, silicon oxynitride, silicon nitride, or another inorganic material having a high dielectric constant.

The gate electrode 145a is arranged on the gate insulating layer 143. The gate electrode 145a is connected to a scanning line (not shown). The gate electrode 145a and the capacitance electrode 145b are also arranged on the gate insulating layer 143. Both of the gate electrode 145a and the capacitance electrode 145b are formed of a conductive material selected from tantalum, tungsten, titanium, molybdenum, aluminum, and the like. The gate electrode 145a and the capacitance electrode 145b may be a single-layer structure of the above-described conductive materials or may be a stacked structure.

The insulating layer 149 is formed of the same material as the gate insulating layer 143, and is arranged on the gate insulating layer 143, the gate electrode 145a, and the capacitance electrode 145b. The insulating layer 149 may be a single layer or a stacked structure of the above materials.

The source-drain electrode 147 is arranged on the insulating layer 149. The source-drain electrode 147 is connected to a signal line (not shown). For the source-drain electrode 147 may be formed of a material similar to that described for the gate electrode 145a. The source-drain electrode 147 may be formed of the same material as the gate electrode 145a or may be formed of a different material. In addition to the source-drain electrode 147, other wirings may be formed using the same conductive material. In this instance, the conductive material is required to have low resistivity, to have good bonding properties with the semiconductor layer 142, and the like.

The insulating layer 150 functions as a planarization film and is arranged on the insulating layer 149 and the source-drain electrode 147. The insulating layer 150 is formed of the organic insulating material such as acrylic resin. Although not shown in particular, it may be formed, for example, as a stacked layer of the organic insulating material and the inorganic insulating material.

The conductive layer 153 is arranged on the insulating layer 150. The conductive layer 153 may be formed of the same material as the gate electrode 145a or may be made of a different material. In addition to the conductive layer 153, other wiring, not specifically shown, are also formed using this conductive layer, which is bonded to the source-drain electrode 147 described above. Therefore, the conductive layer 153 is required to have a low resistivity, to have good bonding properties with the conductive material constituting the source-drain electrode 147, and the like.

The insulating layer 154 is arranged on the insulating layer 150 and the conductive layer 153. The insulating layer 154 is formed of the same material as the gate insulating layer 143.

The pixel electrode 155 has a function of an anode of the display element 130. Further, it is preferable that the pixel electrode 155 has a property of reflecting light. An oxide conductive material such as indium tin oxide (ITO) or indium zinc oxide (IZO) are preferred as the former function, and a conductive material having a high surface reflectivity such as aluminum or silver are preferred as the latter function. In order to achieve both of these functions, structure such as a stacked layer of the oxide conductive layer such as ITO or IZO on the stacked layer of the above-mentioned materials, specifically, the highly surface-reflective conductive layer such as aluminum or silver, is adopted.

The organic EL layer 159 is arranged on the pixel electrode 155. The organic EL layer 159 includes a luminescent material, such as an organic electroluminescent material.

The counter electrode 160 has a function as a cathode of the display element 130. The counter electrode 160 continuously covers the pixel electrode 155 over a plurality of the pixel electrodes 155. The counter electrode 160 is formed of a material having light transmittance and conductivity in order to transmit the light emitted from the organic EL layer 159.

The counter electrode 160 is required to have light transmittance is required. At the same time, the counter electrode 160 is required to have reflectivity to form a microcavity with the reflective surface of the pixel electrode 155. For this reason, the counter electrode 160 is formed as a semitransparent film. Specifically, the counter electrode 160 may be formed of a layer made of silver, magnesium, or alloys thereof by a film thickness sufficient to transmit light.

The bank layer 157 is formed of an organic resin material in order to cover the peripheral portion of the pixel electrode 155 and to form a smooth step at the end portion of the pixel electrode 155. The bank layer 157 may be formed of an organic resin material containing a black pigment in order to increase the contrast ratio of displayed images.

An inorganic insulating layer 162, an organic insulating layer 164, and an inorganic insulating layer 166 are stacked layer in order. The inorganic insulating layer 162, the organic insulating layer 164, and the inorganic insulating layer 166 have a function as the sealing layer 161. The inorganic insulating layer 162 and the inorganic insulating layer 166 are formed of the same material as those of the gate insulating layer 143. The organic insulating layer 164 is formed of the same material as the insulating layer 150 and the bank layer 157. The sealing layer 161 prevents impurities, particularly moisture, generated during manufacturing or due to aging from entering the light-emitting element. In addition to the structure in the present embodiment, the sealing layer 161 may be a single layer or a stacked structure of three or more layers as long as the sealing performance is enough.

The adhesive layer 195 is formed of an inorganic material, an organic material, or composites of the organic and inorganic materials. For example, an acrylic resin is used for the adhesive layer 195.

In the structure according to the present embodiment, the second sensor electrode pattern 190 and the connection electrode 192 are arranged in the same layer.

(2-3. Manufacturing Method of the Display Device)

Hereinafter, a method of manufacturing the display device 10 will be described with reference to FIGS. 6 to 12.

(2-3-1. Forming of the Transistor)

Figure 6:
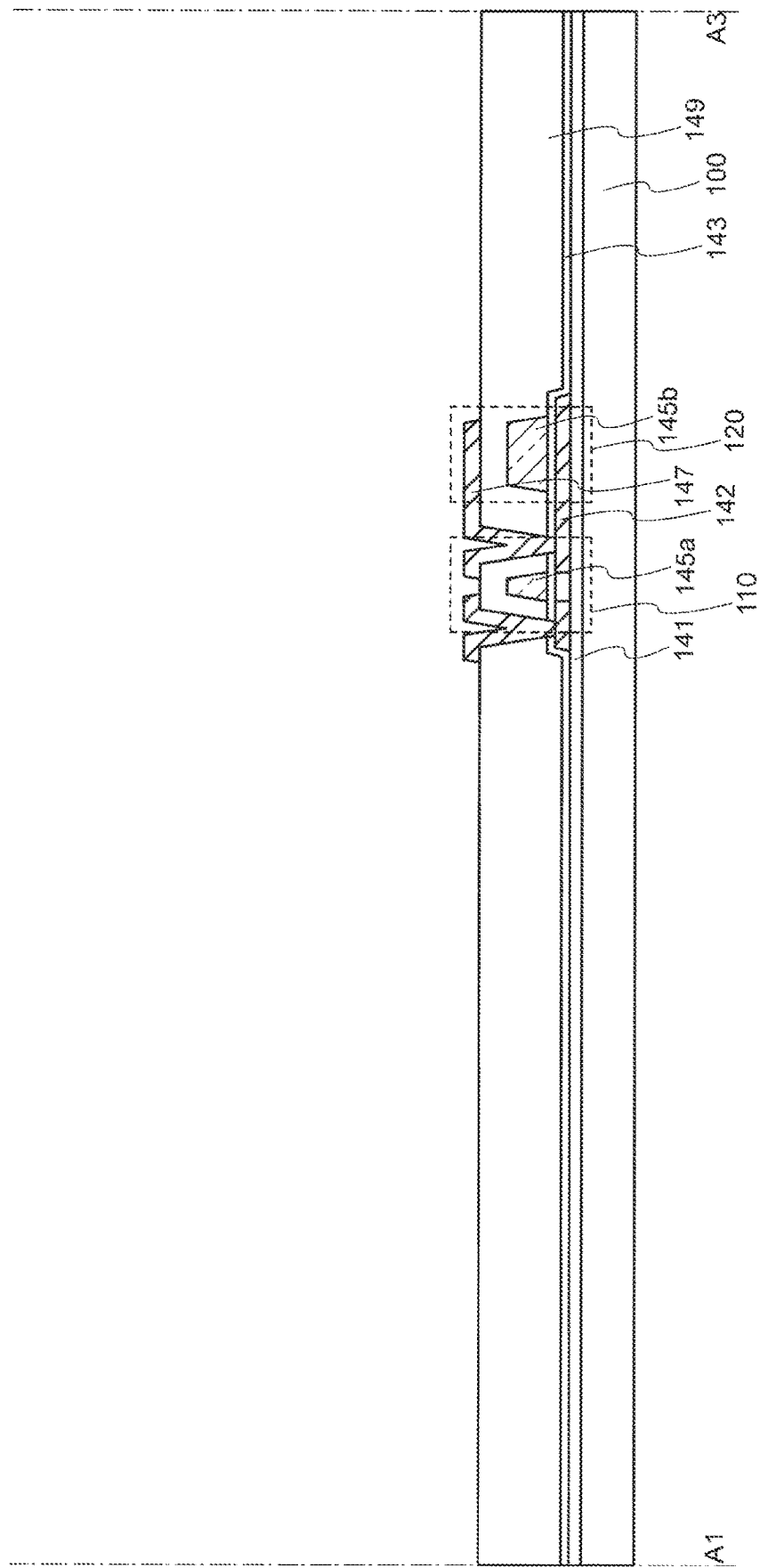
FIG. 6 is a cross-sectional view illustrating a method of manufacturing the display device according to an embodiment of the present invention.

First, as shown in FIG. 6, the insulating layer 141, the semiconductor layer 142, and the gate insulating layer 143 are formed on a first surface (an upper surface when viewed from a cross-sectional direction) of the substrate 100, and then the gate electrode 145a and a capacitor electrode 145b are formed on the gate insulating layer 143. Each layer is processed into a predetermined shape by a photolithography method, a nanoimprinting method, an inkjet method, an etching method, or the like as appropriate.

For example, when the substrate 100 is formed of an organic resin substrate, a polyimide substrate is used.

The insulating layer 141 is formed using a material such as silicon oxide, silicon oxynitride, and silicon nitride. The insulating layer 141 may be a single layer or a stacked layer. The insulating layer 141 is formed by a CVD method, a spin-coating method, a print method, or the like.

When the semiconductor layer 142 is formed of a silicon material, for example, amorphous silicon, polycrystalline silicon, or the like is used. The semiconductor layer 142 is formed of an oxide semiconductor, a metallic material such as indium, gallium, zinc, titanium, aluminum, tin, and cerium. For example, the semiconductor layer 142 is formed of an oxide semiconductor (IGZO) containing indium, gallium, or zinc. The semiconductor layer 142 is formed by a sputtering method, an evaporation method, a plating method, a CVD method, or the like.

The gate insulating layer 143 is formed of an insulating film containing one or more of silicon oxide, silicon oxynitride, silicon nitride, silicon nitride oxide, aluminum oxide, magnesium oxide, hafnium oxide, and the like. It can be formed in the same method as the insulating layer 141.

The gate electrode 145a is formed of a metallic element selected from tungsten, aluminum, chromium, copper, titanium, tantalum, molybdenum, nickel, iron, cobalt, tungsten, indium, and zinc, or an alloy containing any of these metallic elements as a component, or an alloy containing any of these metallic elements in combination, or the like. The gate electrode 145a may be formed of a material containing nitrogen, oxygen, hydrogen, or the like. For example, the gate electrode 145a is formed of a stacked layer film of an aluminum (Al) layer and a titanium layer (Ti) using a sputtering method.

Next, the insulating layer 149 is formed on the gate insulating layer 143 and the gate electrode 145a. The insulating layer 149 is formed of the same material and method as those of the gate insulating layer 143. For example, the insulating layer 149 is formed of a silicon oxide film by a plasma CVD method.

Figure 7:
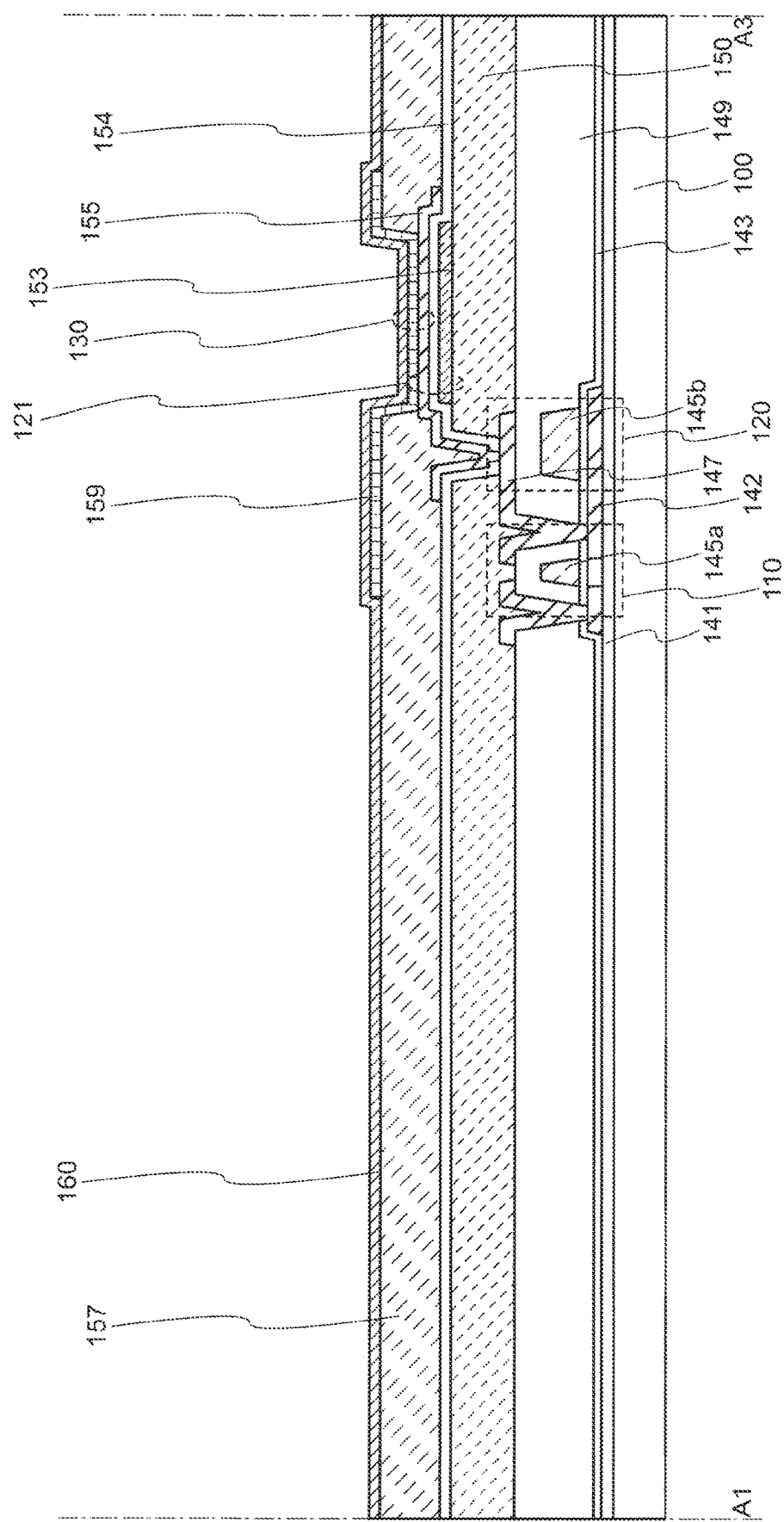
FIG. 7 is a cross-sectional view illustrating the method of manufacturing the display device according to an embodiment of the present invention.

Next, the source-drain electrode 147 is formed on the insulating layer 149 as shown in FIG. 7. The source-drain electrode 147 can be formed using a material and method similar to those of the gate electrode 145a. The source-drain electrode 147 is formed after forming an opening in the insulating layer 149 and is connected to the source/drain region of the semiconductor layer 142.

Next, the insulating layer 150 is formed on the insulating layer 149 and the source-drain electrode 147. The insulating layer 150 is formed of an organic insulating material such as acrylic resin, epoxy resin, polyimide resin, etc. The insulating layer 150 can be formed by a spin-coating method, a print method, an ink-jet method, or the like. For example, the insulating layer 150 is formed of an acrylic resin formed by a spin-coating method. In this case, the insulating layer 150 is formed to such an extent that the upper surface becomes flat. The insulating layer 150 is preferably formed to a thickness of 1 μm or more.

(2-3-2. Formation of the Display Element)

Next, as shown in FIG. 7, the capacitance element 121 (formed by the conductive layer 153, the insulating layer 154, and the pixel electrode 155), the display element 130 (formed by the pixel electrode 155, the organic EL layer 159, and the counter electrode 160), and the bank layer 157 are formed on the insulating layer 150. Each layer is processed into a predetermined shape by a photolithography method, a nanoimprinting method, an inkjet method, an etching method, or the like as appropriate.

First, the conductive layer 153 is formed on the insulating layer 150. The conductive layer 153 may be formed from the material and method similar to the gate electrode 145a. For example, the conductive layer 153 is formed of a stacked layer film of molybdenum, aluminum, or molybdenum by a sputtering method.

Next, the insulating layer 154 is formed on the conductive layer 153. The insulating layer 154 is formed from the material and method similar to the gate insulating layer 143. For example, the insulating layer 154 is formed of a silicon nitride film using a plasma CVD method.

Next, the pixel electrode 155 is formed on the insulating layer 154. For example, the conductive layer 153 may be formed of a light-reflective metal material such as aluminum (Al), silver (Ag), or the like, or may formed of a stacking layer film of a transparent conductive material such as indium tin oxide (ITO) or indium zinc oxide (IZO), which has an excellent hole injecting properties, and a light-reflective metal material. The pixel electrode 155 is formed in the same manner as the gate electrode 145a. For example, the pixel electrode 155 is formed of a stacked layer film of the ITO, silver, and the ITO using a sputtering method.

Next, the bank layer 157 is formed on the insulating layer 154 and the pixel electrode 155. The bank layer 157 is formed with an opening so as to expose the upper surface of the pixel electrode 155. The opening end of the bank layer 157 is preferably a smooth tapered shape. For example, the bank layer 157 is formed of a polyimide film using a spin-coating method.

Next, the organic EL layer 159 is formed on the pixel electrode 155 and the bank layer 157. The organic EL layer 159 is formed using a low molecular weight or a high molecular weight organic material. When a low molecular weight organic material is used, the organic EL layer 159 may include a hole injecting layer, an electron injecting layer, a hole transporting layer, an electron transporting layer, and the like so as to sandwich the emitting layer, in addition to the emitting layer containing a light-emitting organic material.

The organic EL layer 159 is formed to overlap at least the pixel electrode 155. The organic EL layer 159 is formed by a vacuum evaporation method, a print method, a spin-coating method, or the like. When the organic EL layer 159 is formed by the vacuum evaporation method, the organic EL layer 159 may be formed using a shadow mask appropriate while a region which is not formed is arranged. The organic EL layer 159 may be formed using a different material from a neighboring pixel, or the same organic EL layer 159 may be used in all the pixel.

Next, the counter electrode 160 is formed to overlap the pixel electrode 155 and the organic EL layer 159. The counter electrode 160 may be formed of a transparent conductive film such as indium tin oxide (ITO) or indium zinc oxide (IZO), or an alloy of silver (Ag) and magnesium. The counter electrode 160 can be formed by a vapor deposition method or a sputtering method. For example, the counter electrode 160 is formed of a silver-magnesium-alloy film using the vapor deposition method.

(2-3-3. Formation of the Sealing Layer)

Figure 8:
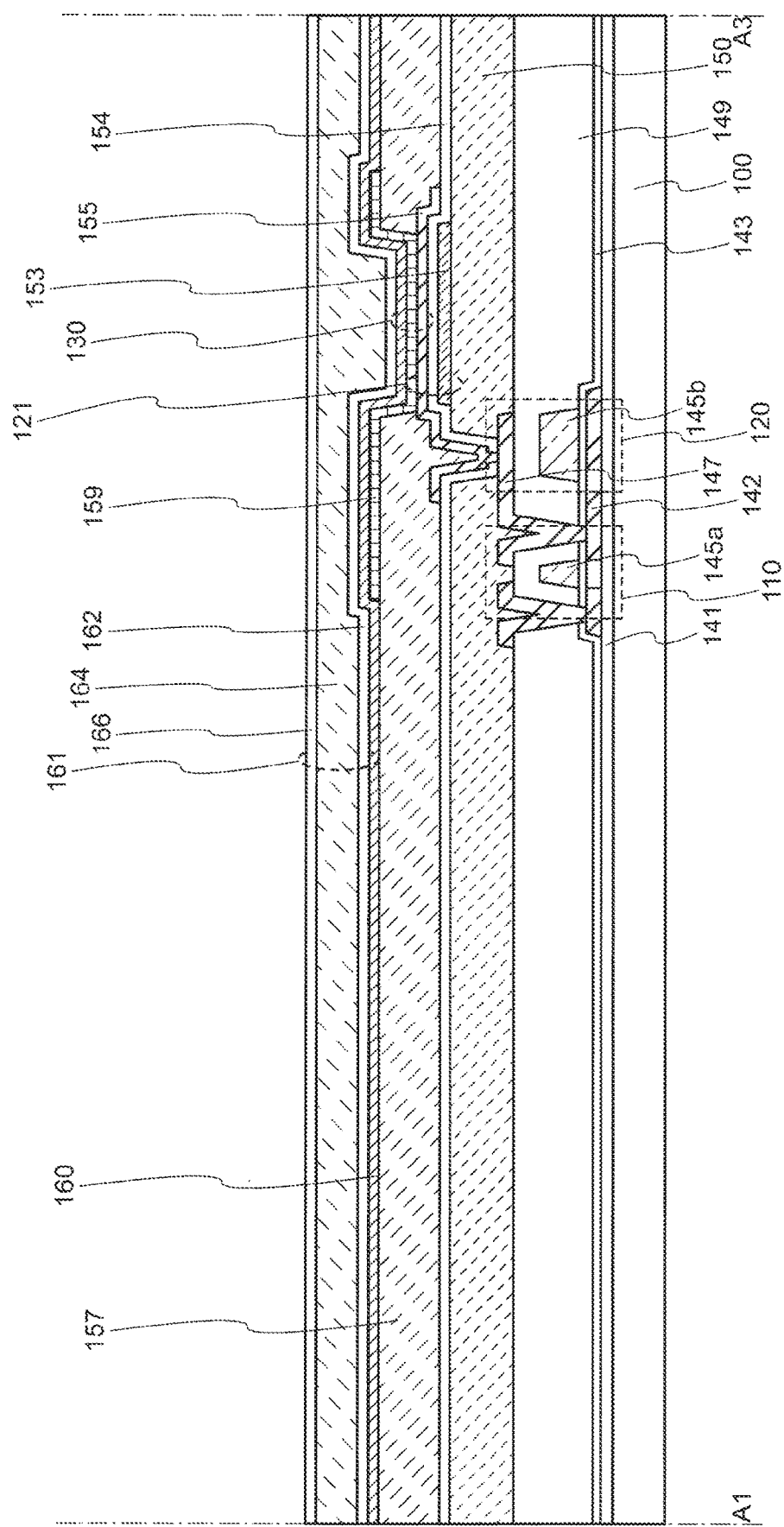
FIG. 8 is a cross-sectional view illustrating the method of manufacturing the display device according to an embodiment of the present invention.

Next, as shown in FIG. 8, the inorganic insulating layer 162, the organic insulating layer 164, and the inorganic insulating layer 166 to be the sealing layer 161 are sequentially formed on the counter electrode 160 and the bank layer 157. The sealing layer 161 is formed to cover the entire surface of the display region 103.

The inorganic insulating layer 162 and the inorganic insulating layer 166 are formed of an insulating film containing one or more kinds of aluminum oxide, silicon oxide, silicon nitride, and the like. The inorganic insulating layer 162 and the inorganic insulating layer 166 are formed using a plasma CVD method, a thermal CVD method, a vapor deposition method, a spin-coating method, a spraying method, or a print method. For example, the inorganic insulating layer 162 and the inorganic insulating layer 166 are formed of a stacked layer film of a silicon nitride film and a silicon oxide film by the plasma CVD method. The thickness of the inorganic insulating layer 162 and the inorganic insulating layer 166 may be several tens of nanometers or more and several micrometers or less.

The organic insulating layer 164 can be formed of materials such as acrylic resin, polyimide resin, and epoxy resin. The organic insulating layer 164 is formed by a spin-coating method, an evaporation method, a spraying method, an ink-jet method, a print method, or the like. The thickness of the organic insulating layer 164 is not limited, and may be, for example, several micrometers or more and several tens of micrometers or less.

(2-3-4. Forming of the Touch Sensor)

Figure 9:
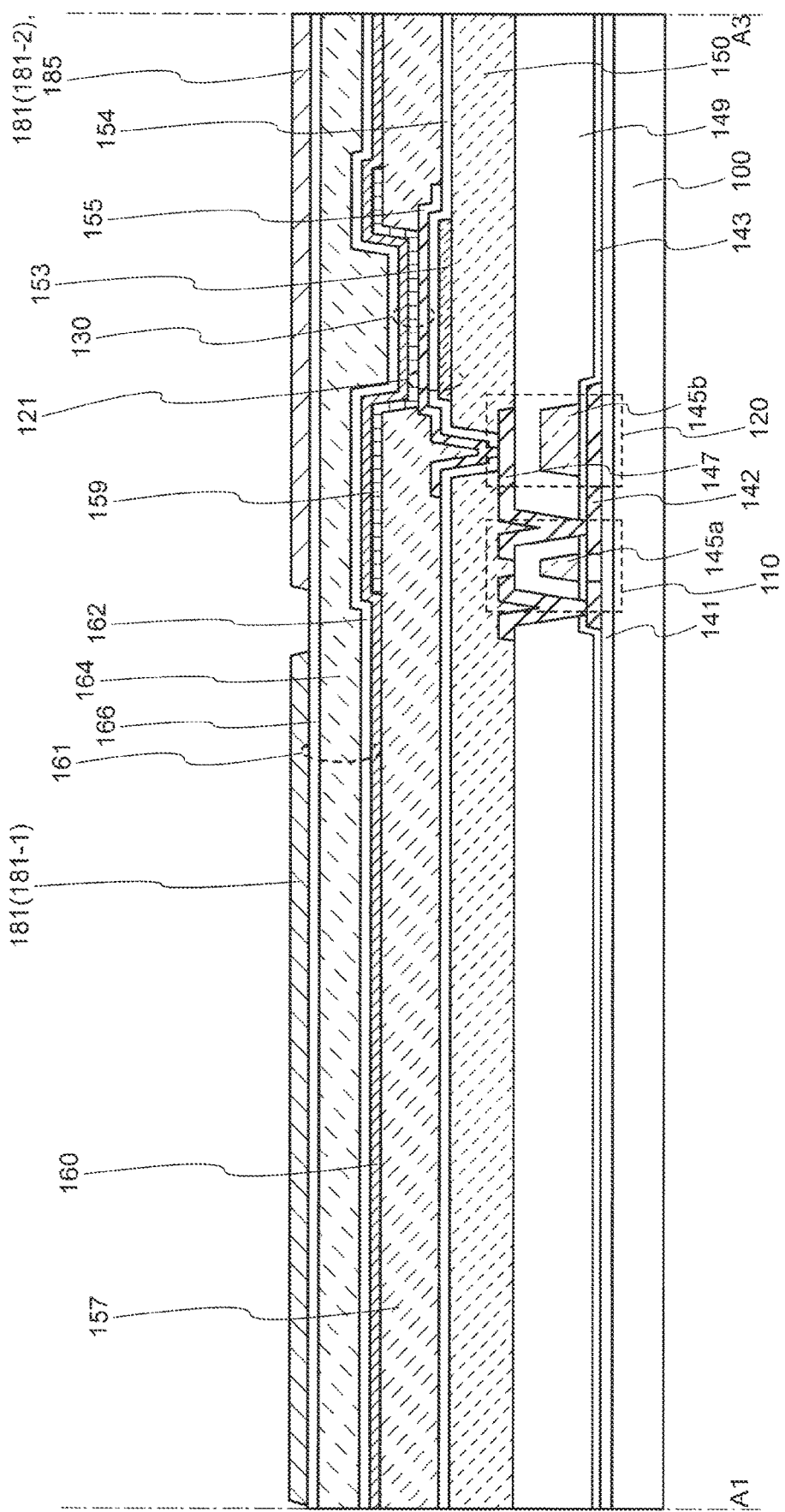
FIG. 9 is a cross-sectional view illustrating the method of manufacturing the display device according to an embodiment of the present invention.

Then, the touch sensor 20 is formed. First, as shown in FIG. 9, the first sensor electrode pattern 181 is formed. In this example, the first sensor electrode pattern 181 is formed by a sputtering method. The first sensor electrode pattern 181 may be deposited using a vapor deposition method, a printing method, a coating method a molecular beam epitaxy method (MBE) or the like, not limited to the sputtering method. After the first sensor electrode pattern 181 is formed, the first sensor electrode pattern 181 is processed by a photolithography method and an etching method. The first sensor electrode patter 181 is formed of indium zinc oxide (IZO), indium tin oxide (ITO), zinc oxide (ZnO), indium tin oxide zinc (ITZO), or the like.

Figure 10:
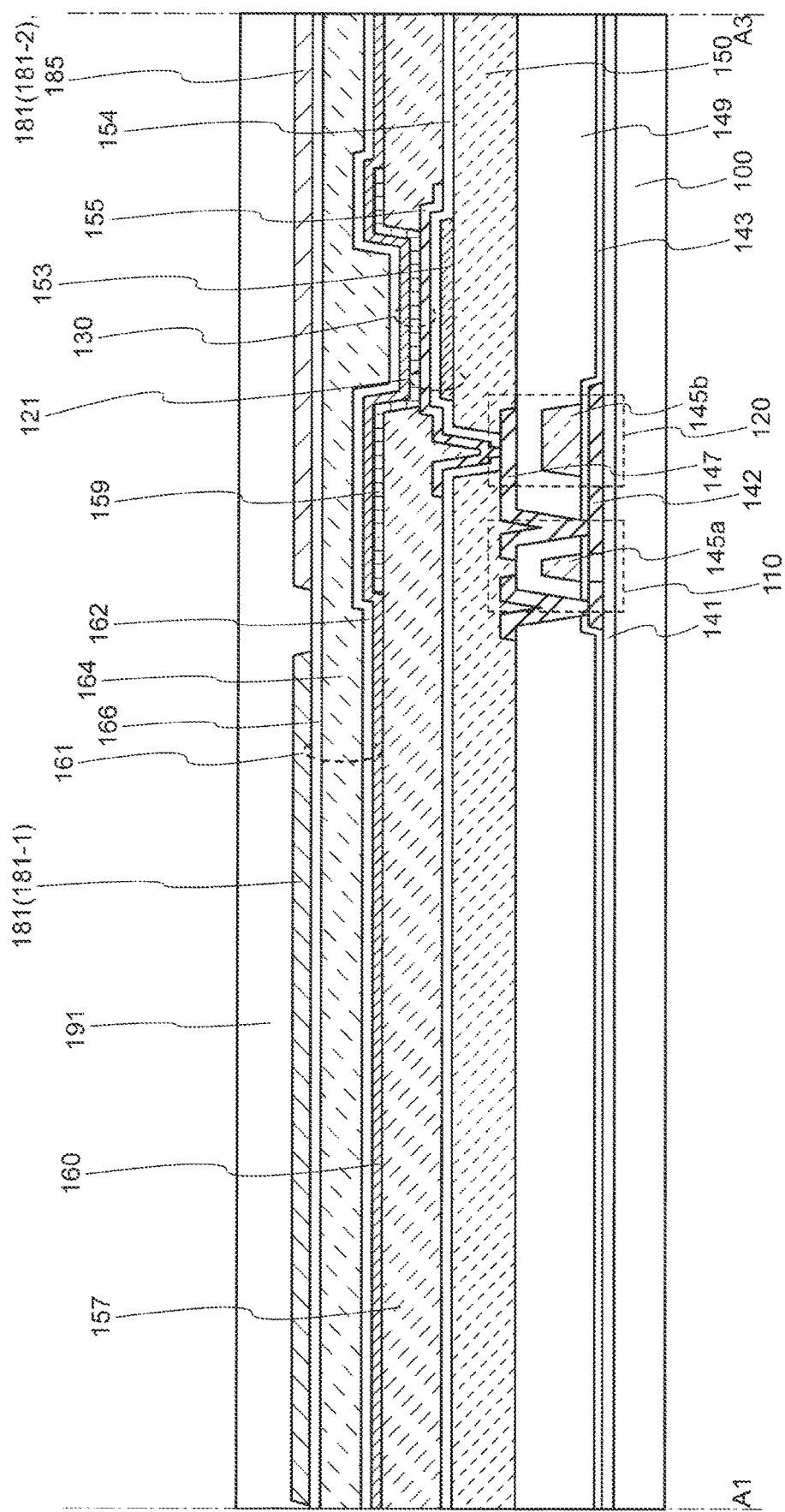
FIG. 10 is a cross-sectional view illustrating the method of manufacturing the display device according to an embodiment of the present invention.

Next, as shown in FIG. 10, the insulating layer 191 is formed. The insulating layer 191 is formed by a coating method. The insulating layer 191 is formed of the organic resin material such as acrylic resin, polyimide resin, and epoxy resin. The insulating layer 191 is formed to have a thickness of several hundred nanometers or more and 10 μm or less by a spin-coating method, an evaporation method, a spraying method, an ink-jet method, a print method, or the like.

Figure 11:
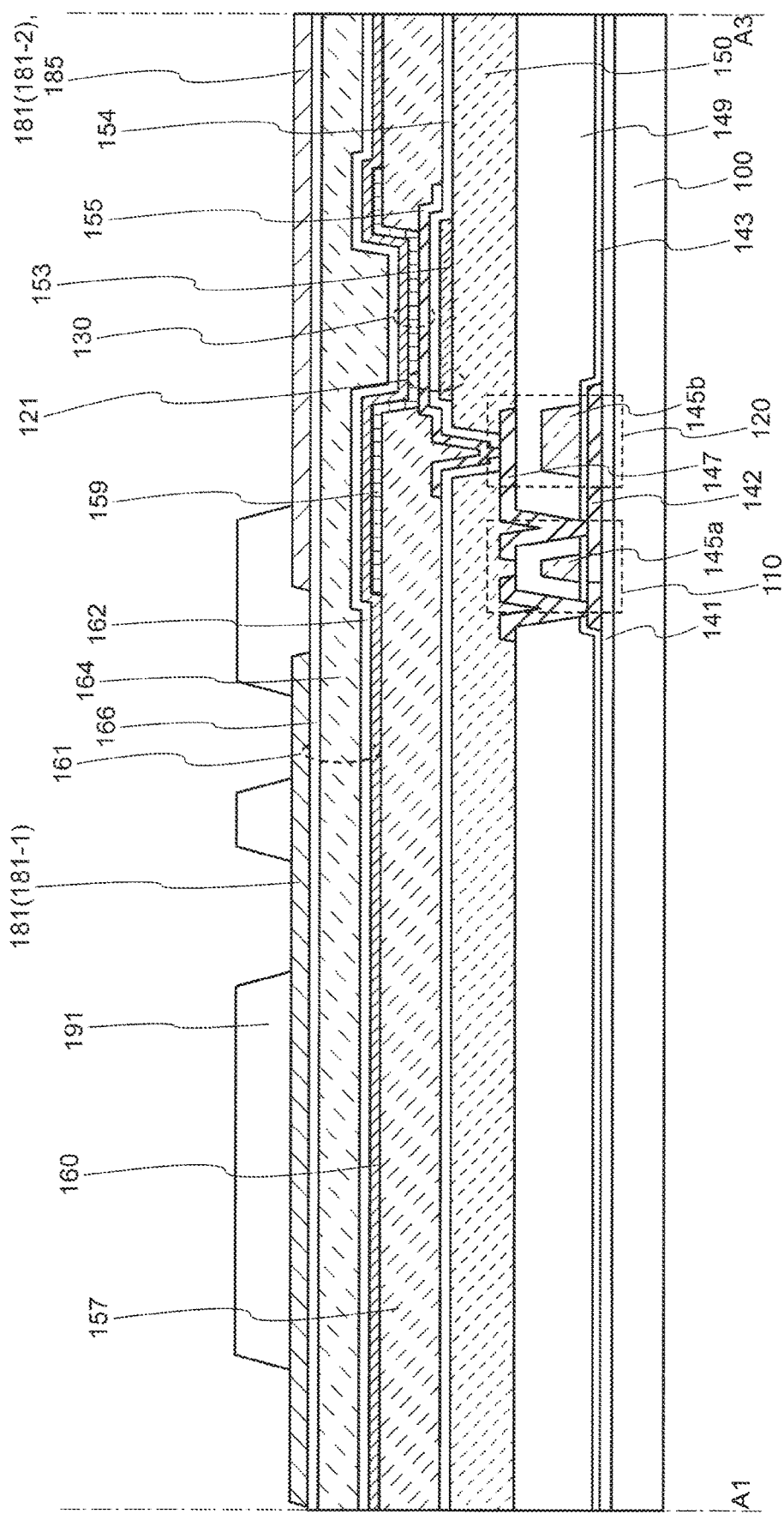
FIG. 11 is a cross-sectional view illustrating the method of manufacturing the display device according to an embodiment of the present invention.

Next, as shown in FIG. 11, the insulating layer 191 is processed. In this case, the insulating layer 191 is processed by the photolithography method and the etching method. If the insulating layer 191 contains a photosensitive material, the insulating layer 191 may be processed by a photolithography method alone.

Figure 12:
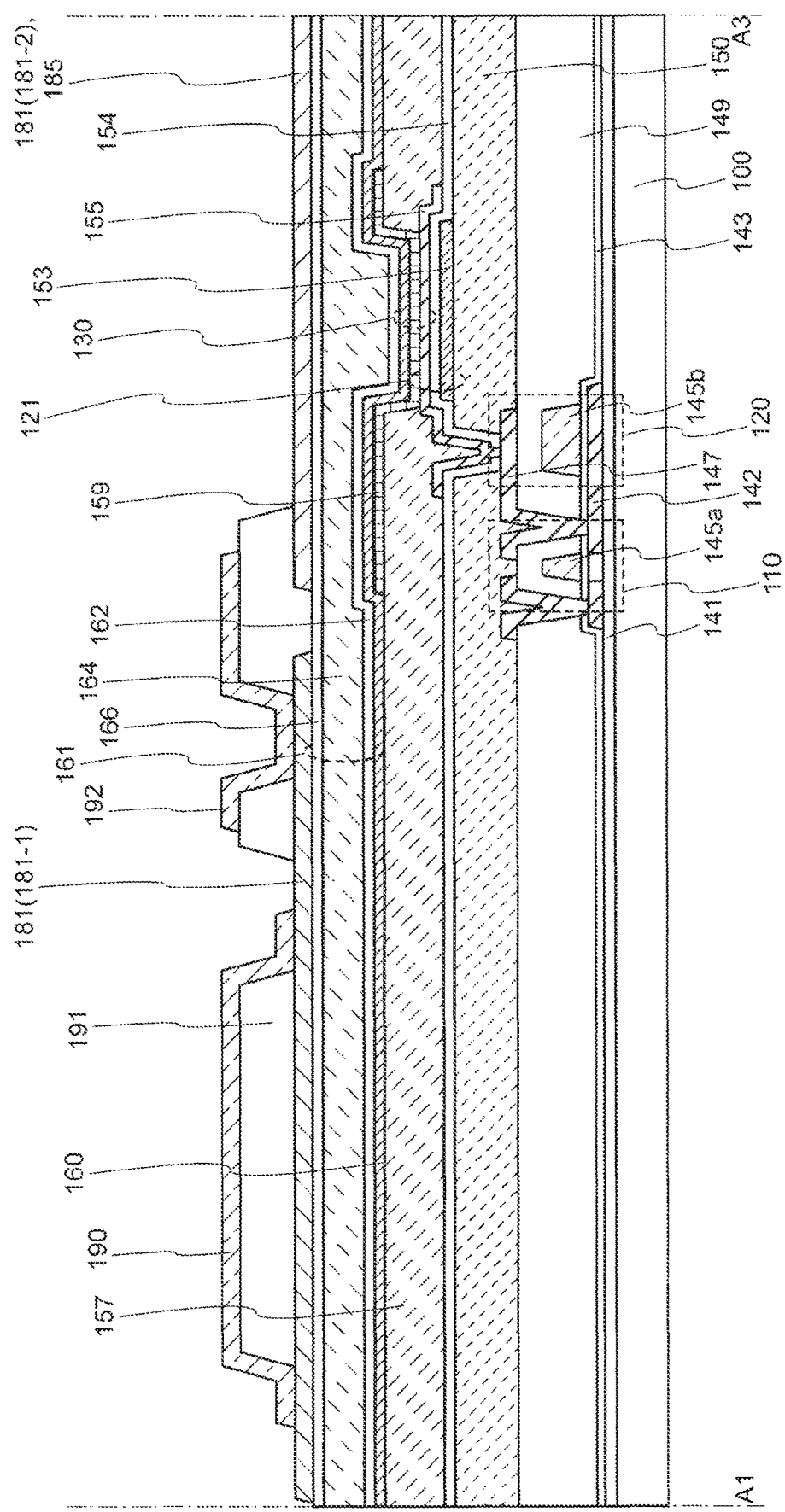
FIG. 12 is a cross-sectional view illustrating the method of manufacturing the display device according to an embodiment of the present invention.

Next, as shown in FIG. 12, the second sensor electrode pattern 190 and the connection electrode 192 are formed. The second sensor electrode pattern 190 and the connection electrode 192 are formed by, for example, a sputtering method. It is noted that the second sensor electrode pattern 190 may be formed by an evaporation method, a printing method, an ink-jet method, or the like, not limited to the sputtering method.

(2-3-5. Pasting with the Counter Substrate)

Finally, the substrate 200 to be a counter substrate is bonded to the substrate 100 using the adhesive layer 195. The adhesive layer 195 is formed of, for example, an epoxy resin, an acrylic resin, or the like.

The display device 10 can be manufactured by using the above manufacturing methods. When the above manufacturing methods are used, the second sensor electrode pattern 190 and the connection electrode 192 are arranged in the same layers. Therefore, there is no need to provide a new step in order to provide the second sensor electrode pattern 190. Therefore, the process load in manufacturing the display device including the touch sensor is suppressed, and the detection accuracy of the touch sensor is improved.

(Modification 1)

In the present embodiment, the organic EL display device is exemplified as a disclosed example, but other application examples include a liquid crystal display device, another self-luminous type display device, an electronic paper type display device having an electrophoretic display element and any flat-panel type display device. It is needless to say that the present invention can be applied from medium and small to large without any particular limitation.

(Modification 2)

Figure 13:
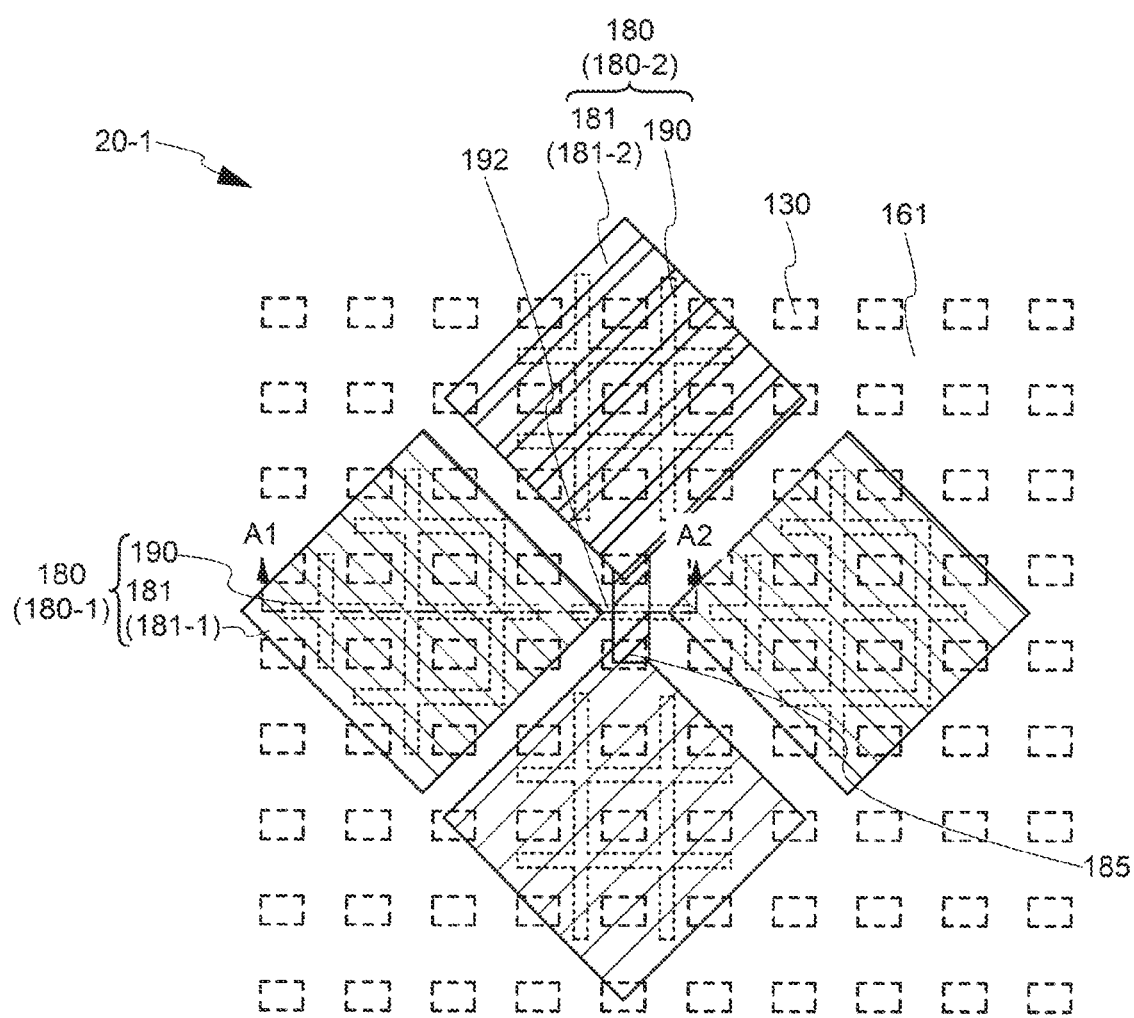
FIG. 13 is a top view showing a part of the touch sensor according to an embodiment of the present invention.
Figure 14:
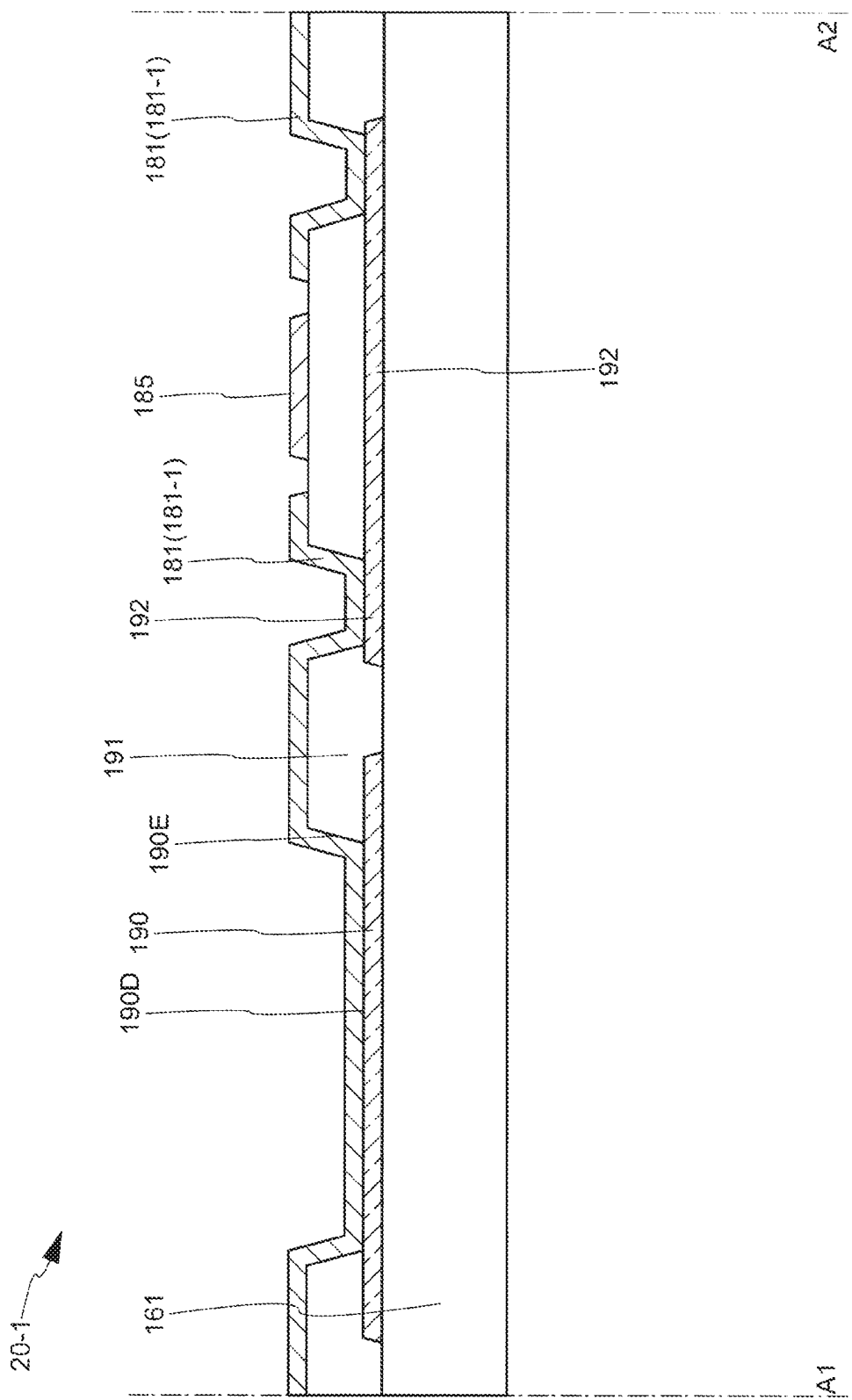
FIG. 14 is a cross-sectional view showing a part of the touch sensor according to an embodiment of the present invention.

In the first embodiment of the present invention, an example in which the second sensor electrode pattern 190 is arranged on the first sensor electrode pattern 181 is shown, but the present invention is not limited thereto. FIG. 13 is an enlarged top view of a part of a touch sensor 20-1. FIG. 14 is a cross-sectional view between A1-A2 of the touch sensor 20-1.

As shown in FIGS. 13 and 14, the sealing layer 161 is arranged on the plurality of display elements 130 (pixel). The second sensor electrode pattern 190 is arranged on the sealing layer 161. As shown in FIG. 13, the second sensor electrode pattern 190 is arranged to overlap with a region between some pixels of the plurality of display elements 130 (pixel) when viewed from the top. The insulating layer 191 is arranged on the second sensor electrode pattern 190 and the sealing layer 161. The insulating layer 191 covers a part of the second sensor electrode pattern 190. The insulating layer 191 has an opening 190E on the second sensor electrode pattern 190.

The first sensor electrode pattern 181 is arranged on the second sensor electrode pattern 190 and the insulating layer 191. The first sensor electrode pattern 181 is overlapped with the plurality of display elements 130 (pixel). As shown in FIG. 14, the second sensor electrode pattern 190 has a connecting portion 190D with the first sensor electrode pattern 181. The first sensor electrode pattern 181 has an unevenness along the form of the second sensor electrode pattern 190. As a result, the surface area of the first sensor electrode pattern 181 can be increased. As a result, the sensitivity of the touch sensor can be improved. In particular, the surface area of the first sensor electrode pattern 181 caused by the unevenness can be increased for a high-definition pixel. Therefore, the detection rate and the detection accuracy of the touch sensor are improved.

As shown in FIG. 14, the second sensor electrode pattern 190 has a flat shape in a cross-sectional view. This makes it easier to control the shapes of the second sensor electrode pattern 190. In order to increase the surface area of the second sensor electrode pattern 190, the second sensor electrode pattern 190 may have un unevenness.

(Modification 3)

Figure 15:
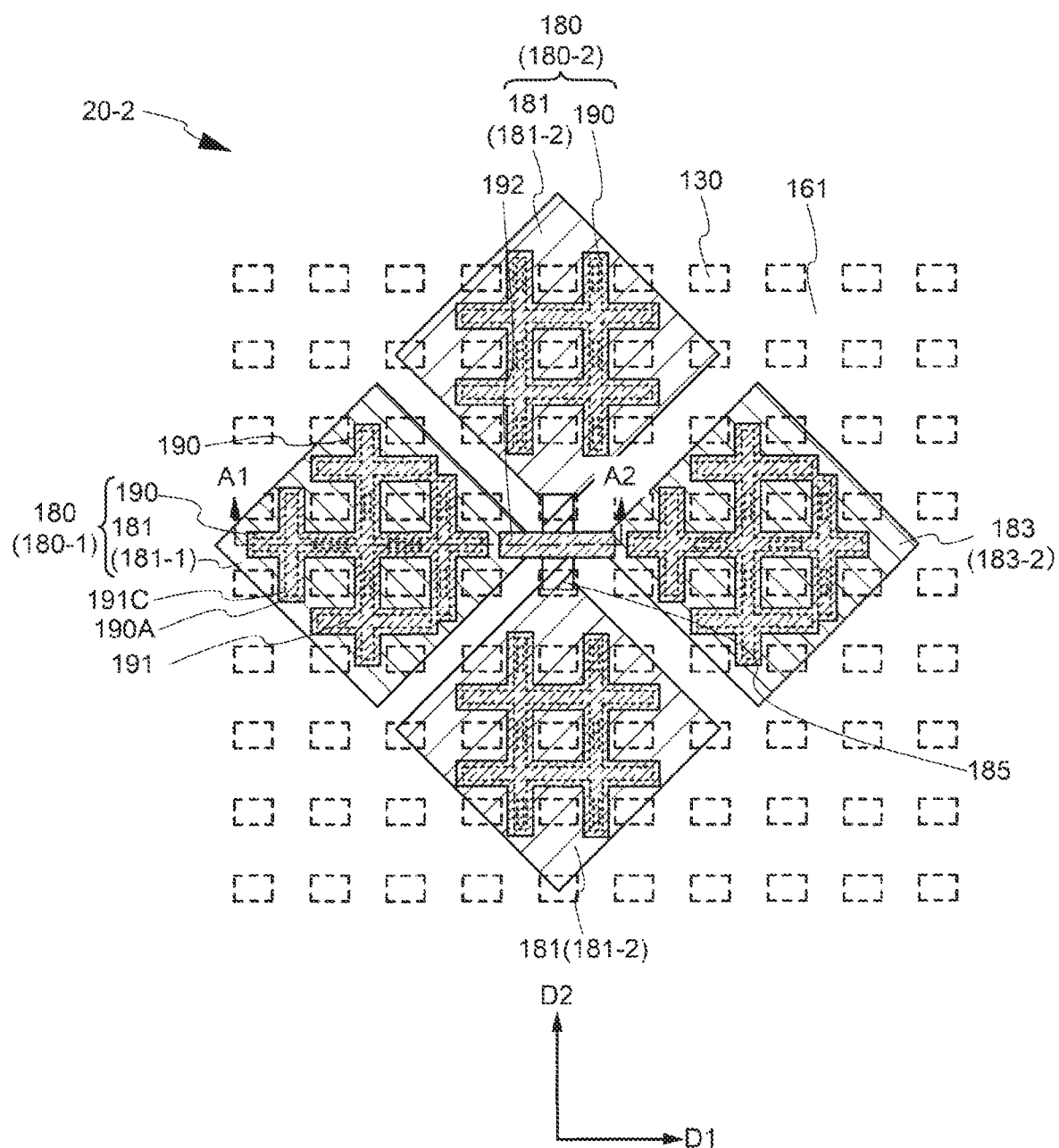
FIG. 15 is a top view showing a part of the touch sensor according to an embodiment of the present invention.
Figure 16:
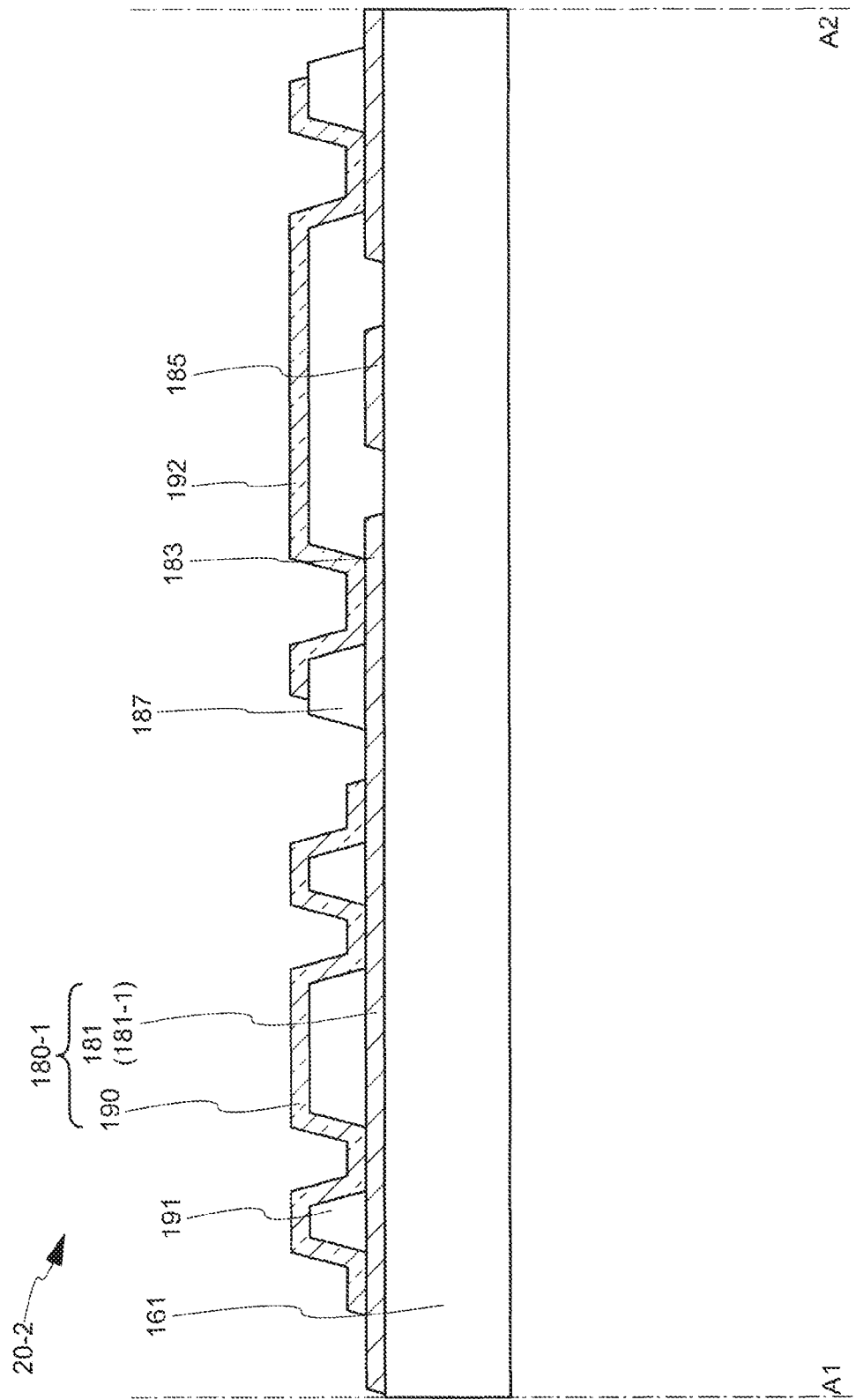
FIG. 16 is a cross-sectional view showing a part of the touch sensor according to an embodiment of the present invention.

In the first embodiment of the present invention, the example in which the second sensor electrode pattern 190 has a convex portion is described, but the present invention is not limited thereto. FIG. 15 is a top view of a touch sensor 20-2. FIG. 16 is a cross-sectional view between A1-A2 of the touch sensor 20-1. As shown in FIGS. 15 and 16, the second sensor electrode pattern 190 may include the concave portion and the convex portion. This further increases the surface area of the second sensor electrode pattern 190. This further lowers the resistivity of the sensor electrode 180. Therefore, the detection rate and the detection accuracy of the touch sensor are improved.

(Modification 4)

Figure 17:
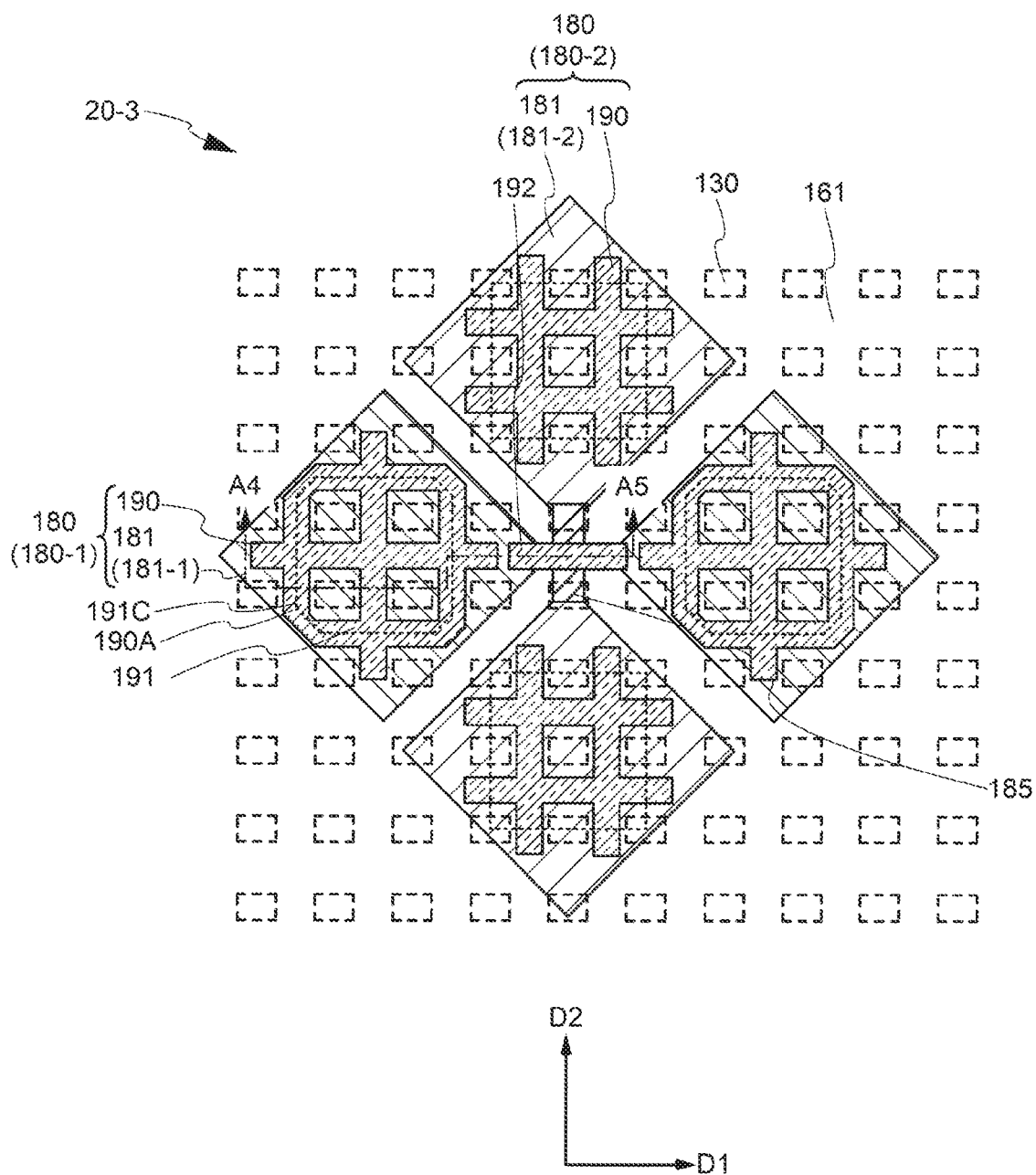
FIG. 17 is a top view showing a part of the touch sensor according to an embodiment of the present invention.
Figure 18:
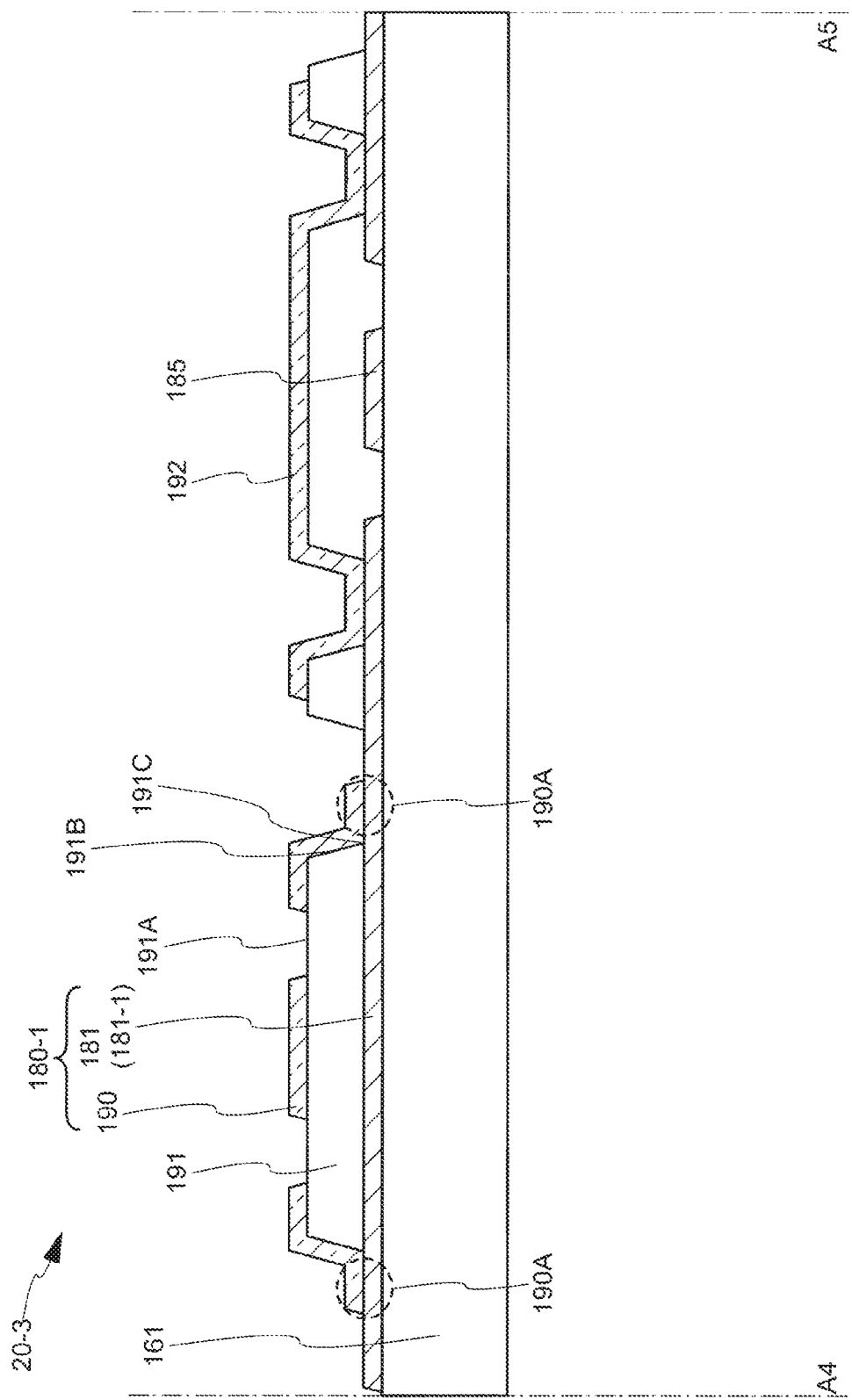
FIG. 18 is a cross-sectional view showing a part of the touch sensor according to an embodiment of the present invention.

In the first embodiment of the present invention, an example in which the second sensor electrode pattern 190 covers the whole of the insulating layer 191 is described, but not limited thereto. FIG. 17 is a top view of a touch sensor 20-3. FIG. 18 is a cross-sectional view of the touch sensor 20-3 during A4-A5. As shown in FIGS. 17 and 18, the insulating layer 191 may have a region that overlaps the display element 130. In this case, the second sensor electrode pattern 190 covers a part of the insulating layer 191. This facilitates alignment of the insulating layer 191 and reduces the resistivity of the sensor electrode 180. The shape of the insulating layer 191 when viewed from above may be a rectangular shape as shown in FIG. 17 or may be a polygonal shape. As shown in FIG. 17 and FIG. 18, the second sensor electrode pattern 190 is arranged on the insulating layer 191 so as to be spaced apart from each other in accordance with the distance between the display element 130.

Figure 19:
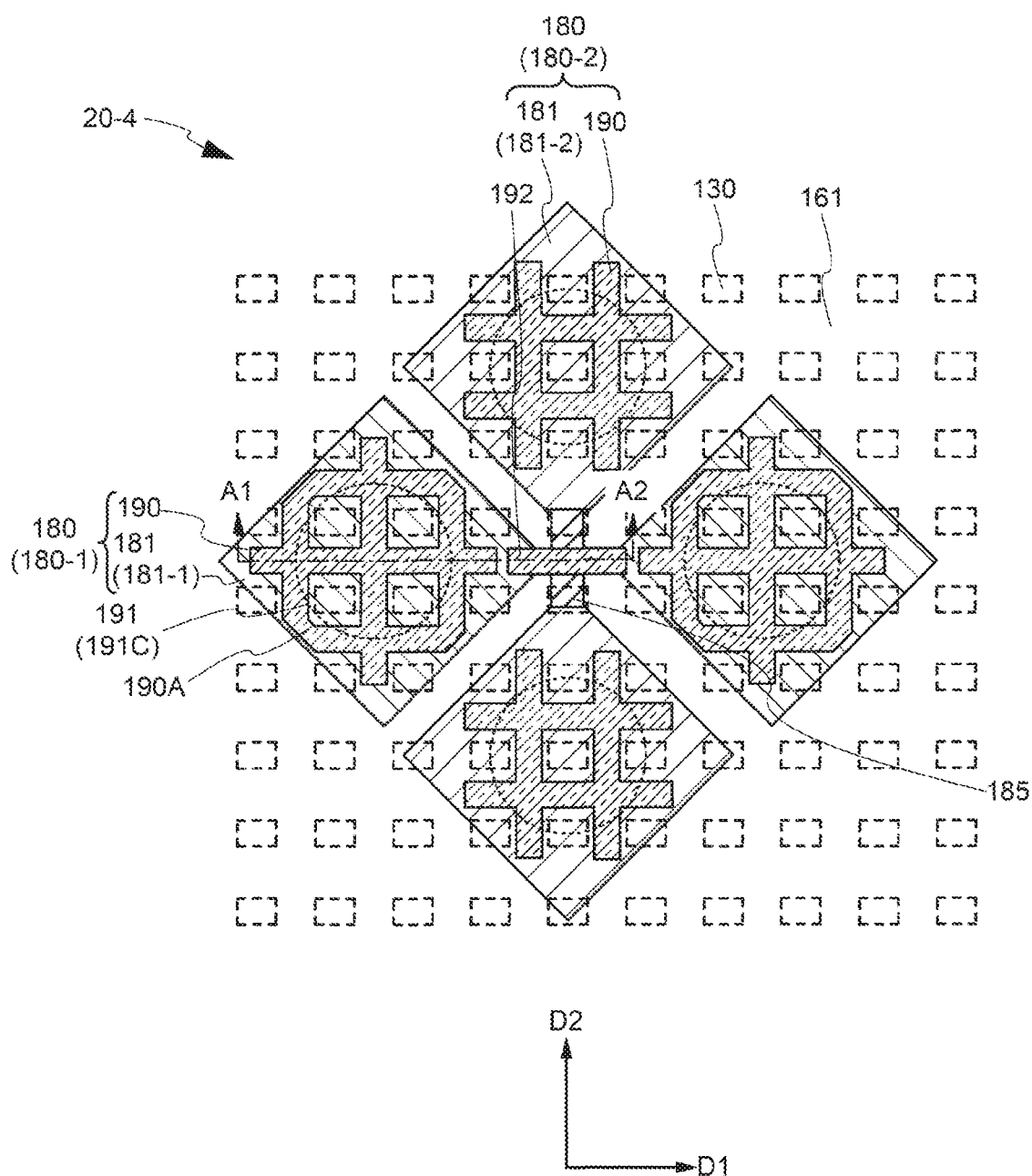
FIG. 19 is a top view showing a part of the touch sensor according to an embodiment of the present invention.

FIG. 19 is a top view of a touch sensor 20-4. As shown in FIG. 19, the insulating layer 191 may have a circular shape when viewed from above.

It should be noted that, within the scope of the concept of the present invention, a person skilled in the art can conceive various changes and modifications, and it is understood that these changes and modifications also belong to the scope of the present invention. For example, as long as the gist of the present invention is included, even if a person skilled in the art adds or deletes components, or changes the design of components for the above-described embodiments, or adds, or omits processes, or changes the conditions of processes to each of the above-described embodiments, they is included in the scope of the present invention.

What is claimed is:

1. A display device comprising: a display region including a plurality of pixels and a separation region between each of the plurality of pixels; and a touch sensor overlapping the display region; wherein the touch sensor includes a sensor electrode and an insulating layer, the sensor electrode includes a first sensor electrode pattern overlapping at least one of the plurality of pixels and a second sensor electrode pattern overlapping at least a part of the separation region, the insulating layer is arranged between the first sensor electrode pattern and the second sensor electrode pattern, and overlaps the first sensor electrode pattern, and covers a first region of the first sensor electrode pattern, and the second sensor electrode pattern is arranged on the insulating layer and the first sensor electrode pattern, and connected to a second region of the first sensor electrode pattern.

2. The display device according to claim 1 further comprising:
a connection portion for connecting the first sensor electrode pattern and the second sensor electrode pattern, wherein
an edge of the insulating layer is surrounded by the connection portion.

3. The display device according to claim 1, wherein
the insulating layer has a region overlapping the plurality of pixels.

4. The display device according to claim 1, wherein
the second sensor electrode pattern has a concave portion and a convex portion.

5. The display device according to claim 1, wherein
a side surface of the insulating layer has a forward tapered shape.

6. The display device according to claim 1, wherein
the first sensor electrode pattern has light transmissivity.

7. The display device according to claim 6, wherein
the second sensor electrode pattern includes a low-resistance metal material.

8. The display device according to claim 1, wherein
the touch sensor is arranged on a sealing layer, and
the sealing layer includes an inorganic insulating layer.

9. The display device according to claim 1, wherein
the sensor electrode includes a first sensor electrode extending in a first direction, and a second sensor electrode extending in a second direction intersecting the first direction.

10. The display device according to claim 1, wherein
each of the plurality of pixels includes an organic EL element.

11. A display device comprising:
a display region including a plurality of pixels and a separation region between each of the plurality of pixels; and
a touch sensor overlapping the display region; wherein
the touch sensor includes a sensor electrode and an insulating layer,
the sensor electrode includes a first sensor electrode pattern overlapping at least one of the plurality of pixels and a second sensor electrode pattern overlapping at least a part of the separation region,
the insulating layer is arranged between the first sensor electrode pattern and the second sensor electrode pattern, and overlaps the first sensor electrode pattern, and covers a first region of the second sensor electrode pattern, and
the second sensor electrode pattern is arranged on the insulating layer and the first sensor electrode pattern, and connected to a second region of the first sensor electrode pattern.

* * * * *